US006879082B2

(12) United States Patent
Erten et al.

(10) Patent No.: US 6,879,082 B2
(45) Date of Patent: Apr. 12, 2005

(54) ELECTROMAGNETIC POSITIONING

(75) Inventors: Gamze Erten, Okemos, MI (US); Mark D. Chuey, Northville, MI (US)

(73) Assignee: Clarity Technologies, Inc., Auburn Hills, MI (US)

( * ) Notice: Subject to any disclaimer, the term of this patent is extended or adjusted under 35 U.S.C. 154(b) by 46 days.

(21) Appl. No.: 10/393,758

(22) Filed: Mar. 21, 2003

(65) Prior Publication Data

US 2003/0178901 A1 Sep. 25, 2003

Related U.S. Application Data

(60) Provisional application No. 60/367,303, filed on Mar. 25, 2002.

(51) Int. Cl.$^7$ .................................................. H02K 1/22
(52) U.S. Cl. ...................................... 310/261; 310/112
(58) Field of Search ................................ 310/261, 112, 310/113, 114

(56) References Cited

U.S. PATENT DOCUMENTS

| 3,548,751 A | 12/1970 | Izhelya et al. |
| 3,631,808 A | 1/1972 | Moyse |
| 3,827,371 A | 8/1974 | Onoda |
| 3,903,808 A | 9/1975 | Foldes |
| 3,904,898 A | 9/1975 | Mailfert |
| 3,904,899 A | 9/1975 | Malfert |
| RE29,165 E | 3/1977 | Bode |
| 4,130,873 A | 12/1978 | Fioretta et al. |
| 4,240,728 A | 12/1980 | Wiedmann et al. |
| 4,281,263 A | 7/1981 | Virolleau et al. |
| 4,390,307 A | 6/1983 | Rice |
| 4,506,205 A | 3/1985 | Trost et al. |
| 4,507,597 A | 3/1985 | Trost |
| 4,535,278 A | 8/1985 | Asakawa |
| 4,555,650 A | 11/1985 | Asakawa |
| 4,616,153 A | 10/1986 | Lee |
| 4,654,571 A | 3/1987 | Hinds |
| 4,675,582 A | 6/1987 | Hommes et al. |
| 4,687,054 A | 8/1987 | Russell et al. |
| 4,694,209 A | 9/1987 | Shindou |
| 4,707,642 A * | 11/1987 | Sorimachi et al. ............ 318/37 |
| 4,721,045 A | 1/1988 | Okawa et al. |
| 4,737,698 A | 4/1988 | McMullin et al. |
| 4,739,241 A | 4/1988 | Vachtsevanos et al. |
| 4,747,668 A | 5/1988 | Meyer et al. |

(Continued)

FOREIGN PATENT DOCUMENTS

| JP | 59-17860 | 1/1984 |
| WO | WO 99/49656 | 9/1999 |
| WO | WO 02/31945 A2 | 4/2002 |

OTHER PUBLICATIONS

Patent Abstracts of Japan Corresponding To 59017860.
ThrustTube Motors, "ThrustBlock Micro Range," 2 pgs, 2001, QM001–AAE.
J. Reinert et al., "Digital control and Optimization of a Rolling Rotor Switched Reluctance Machine," IEEE, vol. 31, No. 2, Mar./Apr. 1995, Abstract.
ThrustTube Motors, "ThrustBlock Range," 2 pgs, 2001, QM0005–AAE.

*Primary Examiner*—Darren Schuberg
*Assistant Examiner*—Nguyen Hanh
(74) *Attorney, Agent, or Firm*—Brooks Kushman P.C.

(57) ABSTRACT

A positioner has a first surface with a plurality of controlled electromagnets and a second surface having a circular cross-section movably positioned relative to the first surface. A plurality of magnetic positioners are disposed around the second surface. Control logic energizes a sequence of the controlled electromagnets to create magnetic interaction with the plurality of magnetic positioner and thereby move the second surface relative to the first surface. A rotor may be positioned to rotate relative to the second surface. Electromagnetic pickups in proximity with the rotor receive a time-varying electromagnetic field from rotor magnets as the rotor rotates, thereby generating electrical energy.

6 Claims, 15 Drawing Sheets

U.S. PATENT DOCUMENTS

| | | |
|---|---|---|
| 4,751,486 A | 6/1988 | Minato |
| 4,781,286 A | 11/1988 | Weaver |
| 4,825,111 A | 4/1989 | Hommes et al. |
| 4,892,467 A | 1/1990 | Crofoot |
| 4,938,025 A * | 7/1990 | Larsen .................. 60/518 |
| 5,021,695 A | 6/1991 | Miyazaki et al. |
| 5,123,818 A | 6/1992 | Gormley et al. |
| 5,174,215 A | 12/1992 | Barrows |
| 5,280,225 A * | 1/1994 | Pine et al. .................. 318/575 |
| 5,319,577 A | 6/1994 | Lee |
| 5,398,804 A | 3/1995 | Ecker et al. |
| 5,402,049 A | 3/1995 | Lee et al. |
| 5,410,232 A | 4/1995 | Lee |
| 5,416,392 A | 5/1995 | Lee et al. |
| 5,449,211 A | 9/1995 | Monford, Jr. |
| 5,542,762 A | 8/1996 | Nakanishi et al. |
| 5,627,418 A | 5/1997 | Satomi et al. |
| 5,666,038 A | 9/1997 | Ohishi |
| 5,734,209 A | 3/1998 | Hallidy |
| 5,791,126 A | 8/1998 | Kammler et al. |
| 5,808,382 A | 9/1998 | Ira et al. |
| 5,994,798 A | 11/1999 | Chitayat |
| 6,005,309 A | 12/1999 | Chitayat |
| 6,061,086 A | 5/2000 | Reimer et al. |
| 6,144,119 A | 11/2000 | Hazelton |
| 6,188,149 B1 | 2/2001 | De Jager et al. |
| 6,208,045 B1 | 3/2001 | Hazelton et al. |
| 6,236,123 B1 | 5/2001 | Pinkerton |
| 6,249,065 B1 | 6/2001 | Oudet et al. |
| 6,259,174 B1 | 7/2001 | Ono |
| 6,274,952 B1 | 8/2001 | Chitayat |
| 6,281,644 B1 | 8/2001 | Komatsu et al. |
| 6,285,097 B1 | 9/2001 | Hazelton et al. |
| 6,331,744 B1 | 12/2001 | Chen et al. |
| 6,664,666 B1 * | 12/2003 | Corcoran .................. 310/12 |
| 2002/0096956 A1 | 7/2002 | Erten |

* cited by examiner

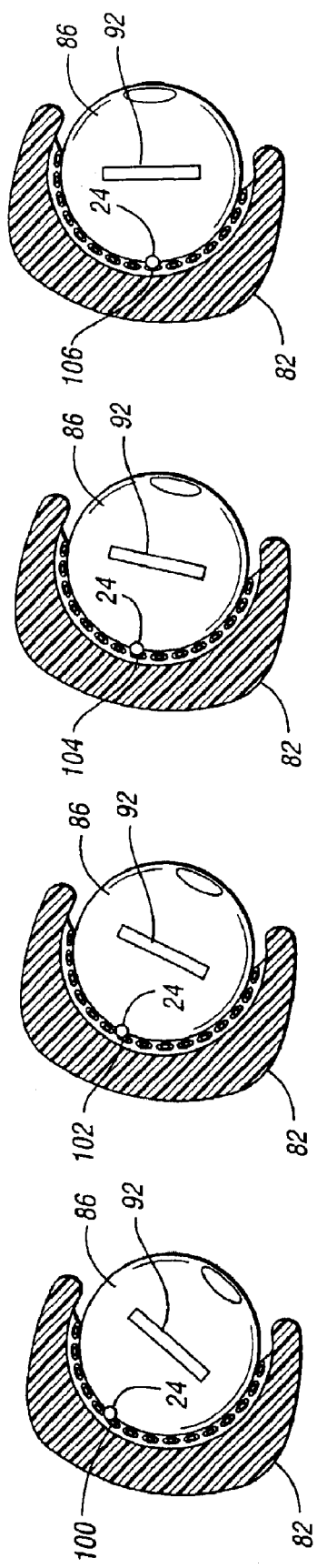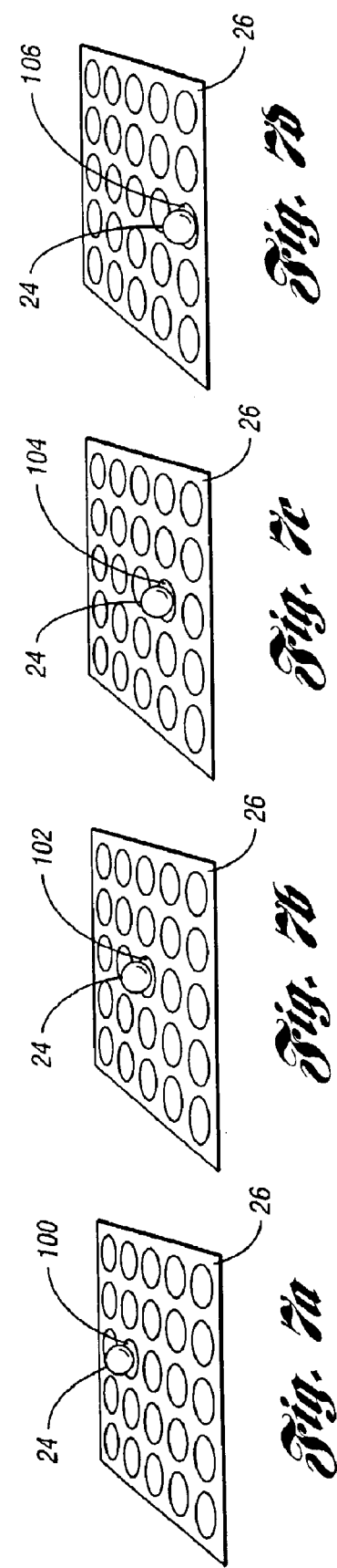

ELECTROMAGNETIC POSITIONING

CROSS-REFERENCE TO RELATED APPLICATIONS

This application claims the benefit of U.S. provisional application Ser. No. 60/367,303 filed Mar. 25, 2002.

STATEMENT REGARDING FEDERALLY SPONSORED RESEARCH OR DEVELOPMENT

Aspects of the present invention were made with Government support under Contract No. DASG60-00-M-0095. The Government may have certain rights to aspects of this invention.

BACKGROUND OF THE INVENTION

1. Field of the Invention

The present invention relates to positioning, such as through rotation and/or translation, using electromagnetic interactions.

2. Background Art

That certain "stones" would attract bits of iron has been well known for centuries. Such materials that have such metal attracting properties are called magnets. A magnet is said to have what is known as magnetic lines of force, invisible to the naked eye but measurable none the less. These lines of force radiate from each end of a bar magnet. Each end is said to be polarized, one being a north (N) pole and the other a south (S) pole. The strength of this magnetic field is dependent on the strength of the magnet. This type of magnet is sometimes called a permanent magnet.

In 1820 Oersted discovered that a current in a wire can also produce magnetic effects, namely, that such current could change the orientation of a compass needle. The magnetic effect of the current through a wire can be intensified by forming the wire into a coil with many turns. The space around the magnet or current carrying wire is defined as the site of a magnetic field. The magnetic effect of current flowing through a coil can be further intensified by providing an iron core inside the coil.

Magnetic actuators take advantage of magnetic effects. Magnetic actuators appear in many forms, including relays, motors, automatic valves, and the like. Magnetic actuation offers the possibility of generating repulsive forces in addition to attractive forces, increasing the flexibility of magnetic actuators.

Current controlled magnetic fields may be used for actuation or positioning of objects. One example is the stepper motor. A stepper motor is an electromechanical device which converts electrical pulses into discrete mechanical movements. The shaft or spindle of a stepper motor rotates in discrete step increments when electrical command pulses are applied in the proper sequence. Motor rotation has several direct relationships to these applied input pulses. The sequence of the applied pulses is directly related to the direction of the motor shaft rotation. The speed of motor shaft rotation is related to the frequency of the input pulses and the length of rotation is directly related to the number of input pulses applied. One problem with stepper motors is that they provide only one-dimensional rotational positioning due to their cylindrical construction.

Another example is the linear motor. Linear motors use a plurality of coils on one flat surface and a plurality of magnets or coils on an interfacing flat surface. By appropriately energizing the coils, the first surface may be made to slide relative to the second surface. One problem with linear motors is that they provide only sliding motion between the two surfaces.

Many applications require complex motions, such as combinations of translation and rotation. These applications include aiming, such as for cameras, microphones, light sources, and the like. Other applications include positioning devices in space, such as robotic manipulators, probes, and the like. Still other applications include transporting systems such as conveyers, remotely controlled devices, robots, and the like. What is needed is to supply multiple degrees or types of motion with a single actuator.

SUMMARY OF THE INVENTION

The present invention uses magnetic forces as a controlled actuation mechanism to move, position, and/or supply power to certain objects of interest.

A magnetic positioner is provided. The positioner has a first flat surface with a plurality of controlled electromagnets spaced about the first surface. A second surface having a circular cross-section is rollably positioned relative to the first surface. A plurality of magnetic positioners are disposed around the second surface. Control logic energizes a sequence of the controlled electromagnets to create magnetic interaction with the plurality of magnetic positioner and thereby move the second surface relative to the first surface.

In various embodiments, each magnetic positioner may be a permanent magnet, an electromagnet, magnetically attracted material, or the like. At least one of the first surface and the second surface may be a flexible printed circuit.

In an embodiment of the invention, the control logic receives signals from the plurality of controlled electromagnets, each received signal from one of the controlled electromagnets generated in response to at least one magnetic positioner moving past the controlled electromagnet. The control logic learns a trajectory of the first surface relative to the second surface based on the received signals.

In another embodiment, the second surface rollably moves relative to the first surface.

A magnetic positioner having a stator surface and a rotor surface is provided. A plurality of controlled electromagnets are spaced about the stator surface. The spherical rotor surface is rollably positioned on the stator surface. A plurality of magnetic positioners are disposed around the rotor surface.

In an embodiment, control logic energizes a sequence of the controlled electromagnets to create magnetic interaction with the plurality of magnetic positioner and thereby move the rotor surface relative to the stator surface.

In another embodiment, the stator surface is flat.

In still another embodiment, the stator surface is tubular. The rotor surface is positioned to roll on the inside surface of the stator surface. The plurality of controlled electromagnets may include a first plurality of electromagnets arranged along a length of the tubular stator surface and a second plurality of electromagnets arranged along the length of the tubular stator surface opposite the first plurality of electromagnets. The tubular stator surface may include at least one branch splitting the tubular stator surface into a first branch tubular stator surface and a second branch tubular stator surface. The plurality of controlled electromagnets may then include at least one electromagnet operative to roll the rotor down the first branch tubular stator surface and at least one electromagnet operative to roll the rotor down the second branch tubular stator surface.

In yet another embodiment, a housing defines a cavity constraining the rotor surface such that, as the rotor surface rolls on the stator surface, the housing translates across the stator surface.

A magnetic system is also provided. The system includes a body having at least one cavity wall defining a cavity. A plurality of controlled electromagnets are spaced about at least one cavity wall. A housing having a curved outer surface defining an electromagnetically transparent opening is rotatively positioned within the cavity. At least one magnetic positioner is fixed to move with the curved outer surface. A rotor is rotatively fixed within the housing so as to rotate by the housing opening. At least one rotor magnet is fixed on the rotor. At least one magnetic pickup is disposed within the housing in proximity with the rotor. Each pickup receives a time-varying electromagnetic field from at least one rotor magnet as the rotor rotates.

In an embodiment, control logic energizes at least one of the controlled electromagnets to create magnetic interaction with at least one magnetic positioner and thereby move the housing relative to the cavity.

In another embodiment, control logic energizes at least one of the controlled electromagnets to create magnetic interaction with the at least one rotor magnet to spin the rotor within the housing.

In still another embodiment, at least one electronic system is disposed within the housing. The electronic system is powered by energy from each pickup receiving a time-varying electromagnetic field.

In yet another embodiment, the plurality of controlled electromagnets spaced about the at least one cavity wall includes a first set of electromagnets for positioning the housing and a second set of electromagnets for rotating the rotor.

In a further embodiment, the at least one rotor magnet fixed on the rotor is a first set of at least one magnet for spinning the rotor and a second set of at least one magnet for generating each time-varying electromagnetic field received by each pickup.

A magnetic actuation system is provided. The system has a first spherical surface with at least one magnetic positioner attached. A second spherical surface is positioned to move relative to the first spherical surface. A plurality of controlled electromagnets are spaced about the second spherical surface. Control logic energizes at least one of the controlled electromagnets to create magnetic interaction with at least one magnetic positioner to move the first spherical surface relative to the second spherical surface.

The spherical surfaces may be concave or convex. Either or both spherical surface may include a flexible printed circuit.

In yet another embodiment, a device to be aimed, such as a camera, may be attached to either of the spherical surfaces.

In still another embodiment, the spherical surfaces may form a joint for positioning a device such as a robotic manipulator.

In a further embodiment, the control logic receives signals from the plurality of controlled electromagnets. Each signal received from one of the controlled electromagnets is generated in response to at least one magnetic positioner moving past the controlled electromagnet. The control logic may use these signals to learn a trajectory of the first spherical surface relative to the second spherical surface.

A method of magnetic actuation for aiming an object is also provided. The object is affixed to a curved surface. The curved surface has at least one attached magnetic positioner. The curved surface is placed in proximity to a second surface. The curved surface is capable of moving in at least two rotational degrees of freedom relative to the second surface. The second surface has a plurality of individually controlled electromagnets arranged in a grid. At least one of the controlled electromagnets is energized to rotatively move the curved surface relative to the second surface to aim the object.

A magnetically aimed camera is also provided. The camera includes a housing having a curved surface and an aperture surface, the aperture surface defining an aperture. An imaging array is disposed within the housing. The imaging array receives light through the aperture. At least one magnetic positioner is disposed within the housing at the curved surface. A socket receives the housing such that the housing curved surface rotates within the socket. A plurality of controlled electromagnets are disposed within the socket for rotating the housing.

In various embodiments, control logic operates the aimed camera to implement at least one of vergence movements, vestibulo-ocular movements, optokinetic movements, saccadic movements, and pursuit movements.

A magnetically aimed transducer is also provided. A housing holds the transducer. At least one magnetic positioner is disposed within the housing at a curved surface. A socket receives the housing with the housing curved surface rotating within the socket. The housing is positioned in the socket such that the transducer is aimable through an opening in the socket. A plurality of controlled electromagnets are disposed within the socket. Each controlled electromagnet is controllable to magnetically interact with the at least one magnetic positioner to rotate the housing within the socket, thereby aiming the transducer.

A method of powering electronics within a housing is also provided. The housing is rotatably located within a cavity formed in a body. At least one electromagnet within the body is energized to position the housing within the cavity. At least one electromagnet within the body is energized to rotate a rotor located within the housing. A time-varying electromagnetic field is generated by rotating the rotor. The time-varying electromagnetic field is converted into an electrical current within the housing.

The above objects and other objects, features, and advantages of the present invention are readily apparent form the following detailed description of the preferred embodiments when taken in connection with the accompanying drawings.

BRIEF DESCRIPTION OF THE DRAWINGS

FIGS. 6a–6d and 7a–7d illustrate operation of a camera according to an embodiment of the present invention;

DETAILED DESCRIPTION OF THE PREFERRED EMBODIMENT(S)

Figure 1:
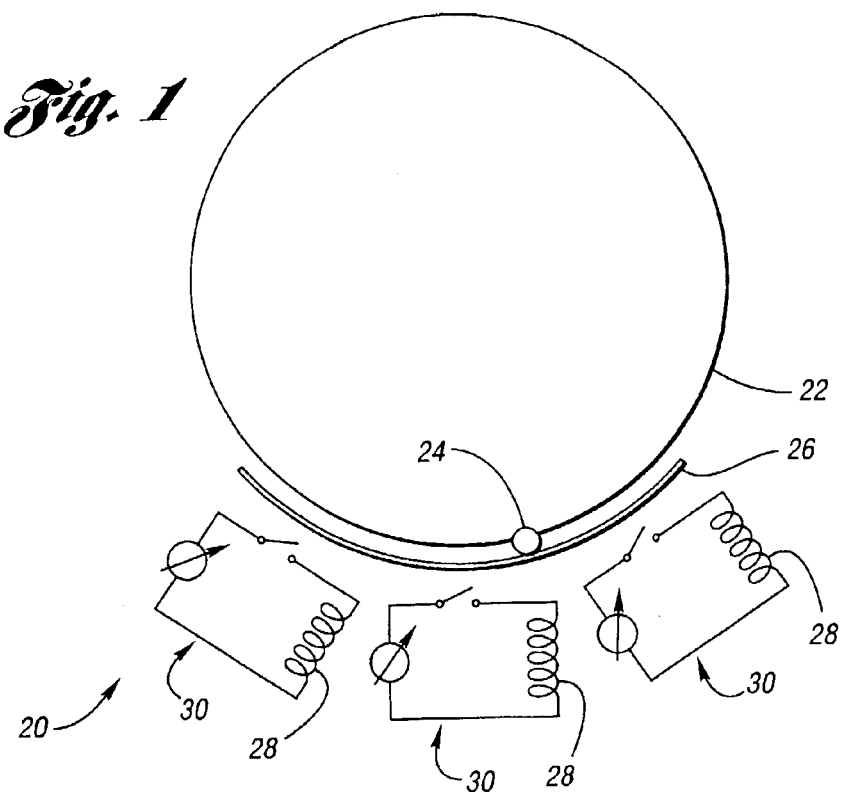
FIG. 1 is a schematic diagram illustrating magnetic actuation applied to a curved actuation surface to accomplish rotational motion according to an embodiment of the present invention.

Referring to FIG. 1, a schematic diagram illustrating magnetic actuation applied to a curved actuation surface to accomplish rotational motion according to an embodiment of the present invention is shown. A magnetic actuation system, shown generally by 20, includes curved surface 22 to which is affixed at least one magnetic positioner 24. Magnetic positioner 24 may be any device or material that creates a mechanical force or motion the presence of a magnetic field such as permanent magnets, electromagnets, or a magnetically attracted material such as iron.

Magnetic actuation system 20 also includes actuation surface 26. Surfaces 22, 26 are arranged such that one may be moved relative to the other, such as by sliding or rotation. Surfaces 22, 26 may be in direct contact or may be separated by a fluid, film, sheet, laminate, or the like. Actuation surface 26 includes a plurality of electromagnetic coils 28. These coils may be energized by circuits, shown generally by 30, to create magnetic fields that interact with one or more magnetic positioners 24. This interaction moves curved surface 22 relative to actuation surface 26. Thus, objects fixed to either curved surface 22 or actuation surface 26 may be aimed or positioned relative to the other surface 26, 22, respectively.

Magnetic positioner 24 can be attracted or repelled from each coil 28 depending on the magnitude and polarity of current through coil 28. Movement of magnetic positioner 24 can be carried out in a stepping motion, where coils 28 along a path of desired trajectory are actuated sequentially.

Actuation surface 26 may be flat or curved. A flat actuation surface 26 allows for translational or planar motion as well as for rotational motion between surfaces 22, 26. A curved activation surface 26 is more restricted to rotational motion, but permits easier implementation of multiple degrees of rotation. For example, actuation surface 26 may be part of a spherical cavity or socket lined with an array of electromagnetic coils 28. A permanent magnet, used to implement magnetic positioner 24, is affixed to curved surface 22 of a sphere inserted in the socket. The changing magnetic field rotates the sphere inside the socket. What is more, the mechanism adds additional degrees of freedom. The resulting structure is capable of more than simple pan and tilt movements and any arbitrary aiming trajectory can be defined. In fact, using the mechanism for the actuation of an artificial eye socket, it is possible to emulate all known types of human eye movements.

Figure 2:
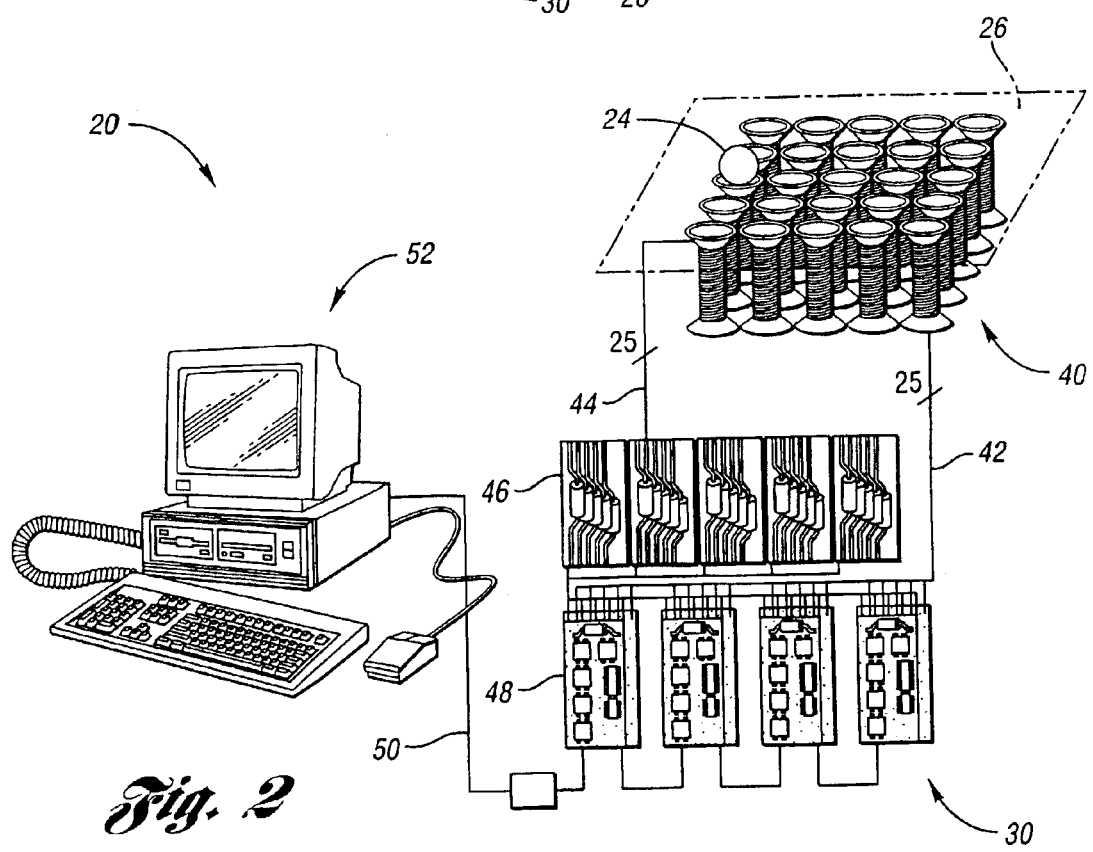
FIG. 2 is a schematic diagram illustrating magnetic actuation according to an embodiment of the present invention.

Referring now to FIG. 2, a schematic diagram illustrating magnetic actuation according to an embodiment of the present invention is shown. A portion of magnetic actuation system 20 is shown with actuation surface 26 supporting a grid of coils, shown generally by 40, arranged in a five-by-five, two-dimensional array of coils 28. Each coil 28 in array 40 has one end connected to ground (GND) wire 42 and a second wire 44 connected to a resistor, shown on resistor boards 46. Resistors and ground wires 42 connect to switchable drivers 48. Switchable drivers 48 may implement on-off switching, may control the magnitude of current or voltage supplied to coils 28, may control the polarity of current or voltage supplied to coils 28, or any combination. The construction of electronic circuits for supplying power to coils 28 is well known in the art. Serial link 50 supplies switchable drivers 48 with control commands from computer 52.

Motion between surfaces 22, 26 occurs due to attraction or repulsion of magnetic positioner 24 from one coil 28 to another coil 28. During the process of magnetic actuation, some of coils 28 will be inactive. The active coils 28, however, conduct a current causing a magnetic field in a certain direction. Magnetic positioner 24 is attracted to or repelled from each coil 28 based on the polarity of a magnetic field produced by coil 28. Thus, to move magnetic positioner 24 to a specific location, each coil 28 in the route to the desired location may be switched on and off in a stepping motion. For example, a certain pattern of logical zeros (selecting GND) and ones (selecting power supply voltage through a resister) can define a desired trajectory for magnetic positioner 24 about array of coils 40. This may be accomplished, for example, through the use of software executing on computer 52.

In an embodiment of the present invention, sensors in activation surface 26 detect movement of curved surface 22 relative to activation surface 26. These sensors may be any type of motion sensors. Preferably, motion is detected by at least one magnetic positioner 24 moving past coil 28. Such motion induces a voltage in coil 28, which may be sensed by circuitry associated with switchable drivers 48. These voltages produce position signals which are relayed to computer 52. Computer 52 then learns the trajectory of curved surface 22 relative to activation surface 26. This trajectory may be replayed by computer 52, allowing magnetic actuation system 20 to be manually taught one or more movements.

Figure 3:
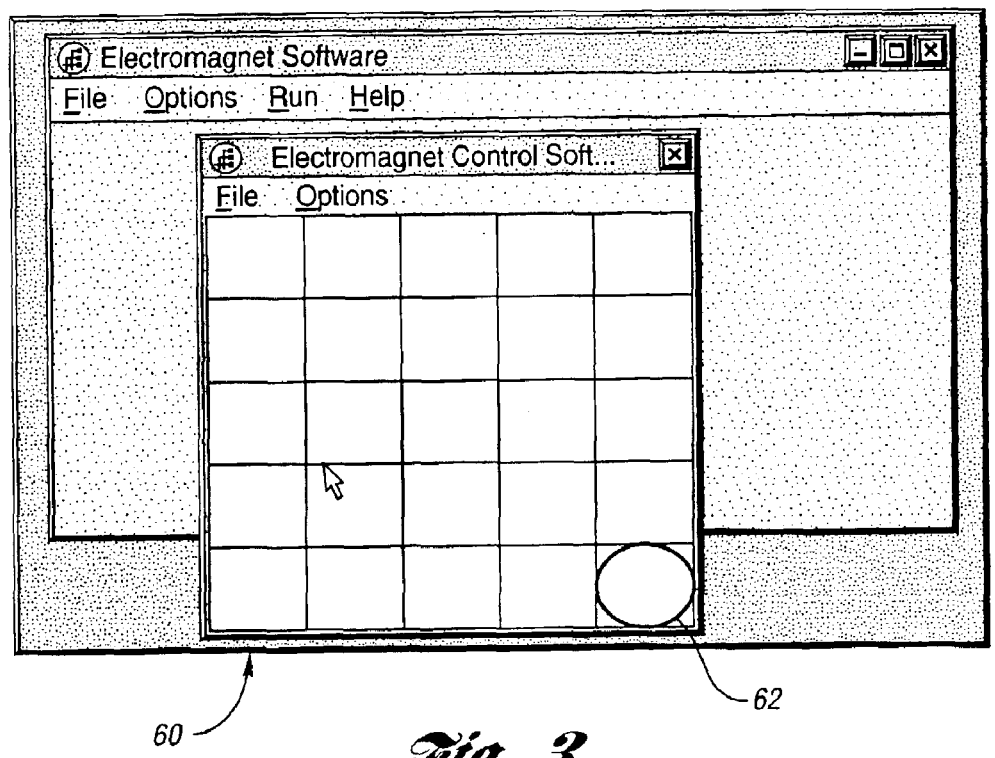
FIG. 3 is a screen captured during execution of interactive software used to control a magnetically actuated positioner according to an embodiment of the present invention.

Referring now to FIG. 3, a screen captured during execution of interactive software used to control a magnetically actuated positioner according to an embodiment of the present invention is shown. Coil grid 40 is represented by computer 52 as a five-by-five table of squares, shown generally by 60. Magnetic positioner 24 is represented by computer 52 as circle 62 in the bottom right hand corner square. Each square in display grid 60 represents a possible new location for magnetic positioner 24. Given the initial starting point of magnetic positioner 24, a user or control program may select a new destination for magnetic positioner 24 by selecting any of the available squares in display grid 60.

In one embodiment, computer 52 calculates a Manhattan geometry path between the current location of magnetic positioner 24 and the desired location for magnetic positioner 24. One aspect of this calculation is versatility. After a destination point for magnetic positioner 24 is specified, there are many trajectories that can be taken. These can be accommodated in a direct manner. In a simplified system, a Manhattan geometry path is taken unless a diagonal path is available.

Figure 4:
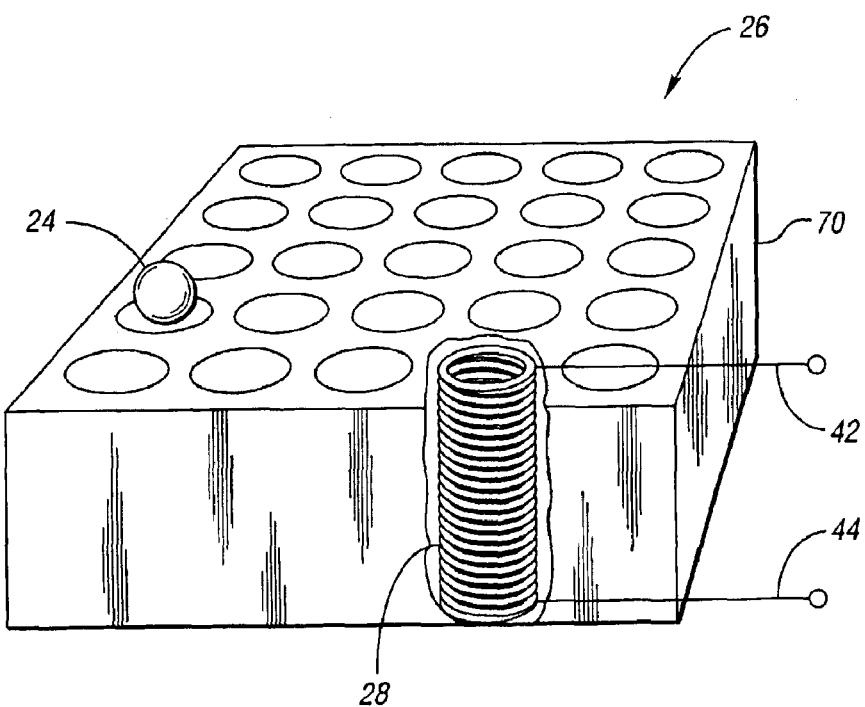
FIG. 4 is an illustration of an actuation surface according to an embodiment of the present invention.

Referring now to FIG. 4, an illustration of an actuation surface according to an embodiment of the present invention is shown. Coils 28 are embedded in insulative material 70 such as, for example, polytetraflouoroethylene, polyvinylidine fluoride, polyethylene, chlorinated polyethylene, polypropylene and other polyolefins, polyamides, and the like. If actuation surface 26 is curved, insulative material 70 may be molded as a curved surface or made as a flat sheet and formed as desired. In one embodiment, copper coils 28 and connecting wires are deposited on a thin sheet of insulative material 70. The material may be cut or precut in a pattern inducive to the final shape of actuation surface 26. For example, a rectangular pattern may be used for flat or cylindrical activation surfaces 26. If activation surface 26 is spherical, insulative material 70 may be shaped as a flattened sphere. The insulative material 70 may then be held in place with an adhesive.

Curved surface 22 may be made in a similar manner. For convex curved surface 22, coils or permanently magnetic material may be placed or deposited on oriented polyethylene, which may be cut or precut based on the desired shape of curved surface 22. The oriented polyethylene may then be attached by heat shrinking, adhesion, or the like.

Figure 5:
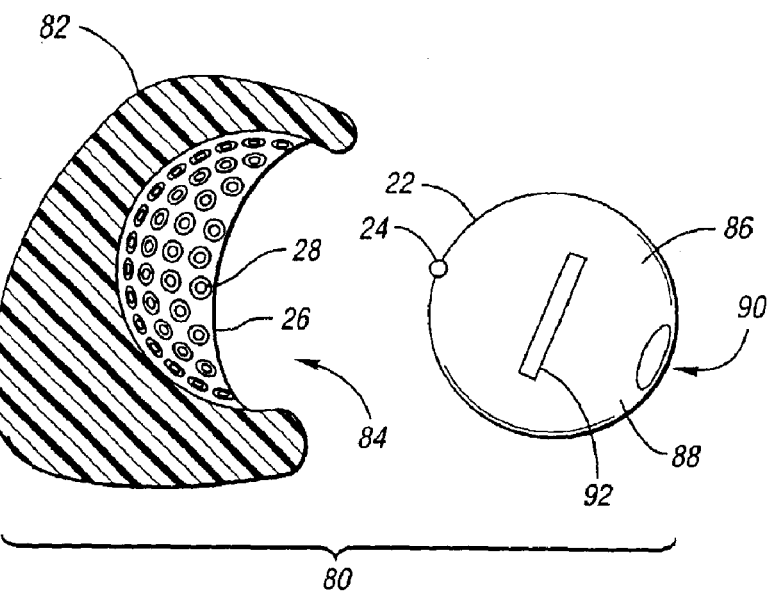
FIG. 5 is an exploded view drawing illustrating a camera according to an embodiment of the present invention.

Referring now to FIG. 5, an exploded view drawing illustrating a camera according to an embodiment of the present invention is shown. Camera 80 includes socket 82 having a cavity, shown generally by 84, lined with actuation surface 26 having a plurality of coils 28. Camera 80 also includes housing 86 having curved surface 22 and aperture surface 88. Aperture surface 88 defines aperture 90 which admits light into housing 86. Aperture 90 may include a light modifying device such as a lens, an iris, and the like. Imaging array 92 is positioned within housing 86 to receive light entering through aperture 90. At least one magnetic positioner 24 is disposed within housing 86 at curved surface 22. Housing 86 is inserted in socket 82 such that housing 86 is rotatively movable relative to housing 86.

Referring now to FIGS. 6a–6d and 7a–7d, operation of a camera according to an embodiment of the present invention is shown. Each of FIGS. 7a-7d illustrate the relative position of magnetic positioner 24 on actuation surface 26 to produce the aiming of camera 80 shown in corresponding FIGS. 6a–6d. Actuation surface 26 in each FIGS. 7a–7d is shown flattened for ease of illustration.

In FIGS. 6a and 7a, first attracting coil 100 is switched on, holding magnetic positioner 24 at first attracting coil 100. In FIGS. 6b and 7b, second attracting coil 102 is switched on, moving magnetic positioner 24 and changing the aim of imaging array 82 within housing 86. First attracting coil 100 may be switched off or may be switched to repel magnetic positioner 24. In FIGS. 6c and 7c, third attracting coil 104 is on, further moving magnetic positioner 24 and rotating housing 86. In FIGS. 6d and 7d, fourth attracting coil 106 is on, still further moving magnetic positioner 24 and rotating housing 86.

Figure 8:
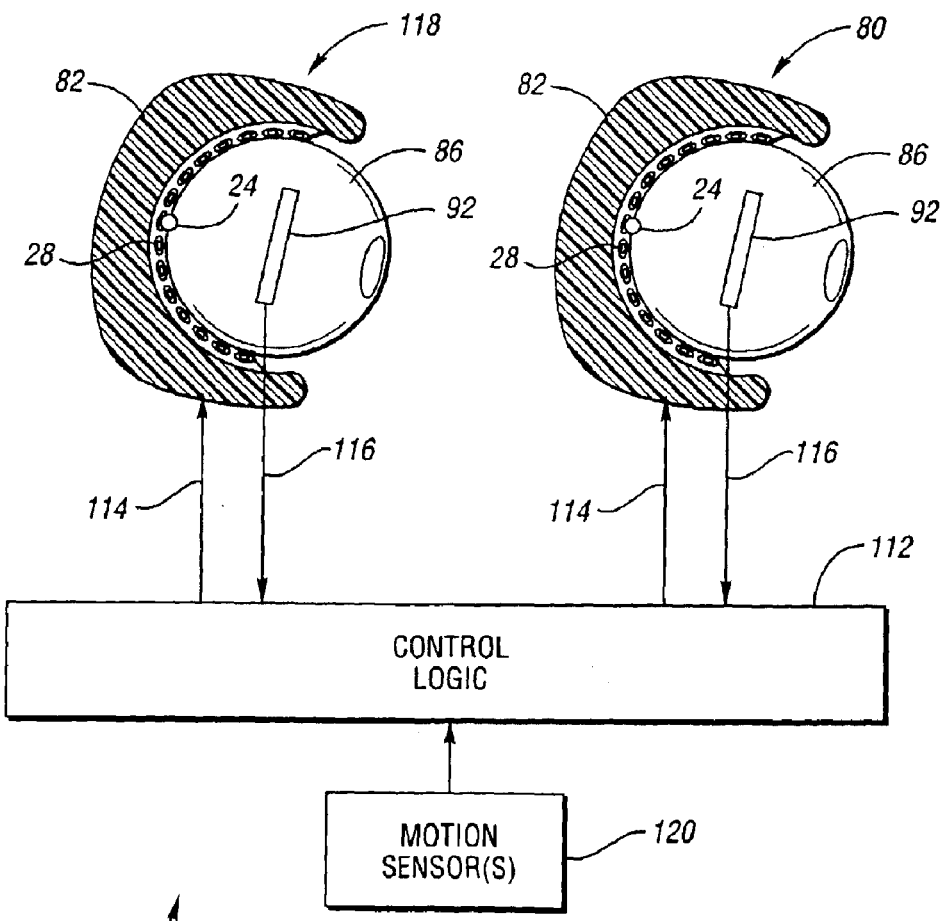
FIG. 8 is a block diagram of a magnetically aimed camera system according to an embodiment of the present invention.

Referring now to FIG. 8, a block diagram of a magnetically aimed camera system according to an embodiment of the present invention is shown. A camera system, shown generally by 110, includes magnetically actuated camera 80 and control logic 112. Control logic 112 generates control signals 114. Control signals 114 energize electromagnets 28 in socket 82 to create interaction with at least one magnetic positioner 24 in housing 86 to rotate and position housing 86 relative to socket 82. This aims the field of view of imaging array 92. Control logic 112 may base control signals 114 on image signals 116 received from imaging array 92. Control logic 112 may receive inputs from additional sources. One such source is second camera 118 which may be, for example, another magnetically actuated camera aimed by control logic 112. Another such source is one or more motion sensors 120. Control logic 112 may be implemented in a variety of means such as, for example, computer 52, custom logic, discrete electronic components, software, firmware, any combination of these, or the like. Control logic 112 may be distributed, with portions implemented within housing 86.

The actuated object in this embodiment is camera 80, 118, creating a device that can be controlled to operate like an eyeball. Magnetic actuation permits the eyeball to implement an arbitrary trajectory. Such a system 110 can reproduce all known types of movements of the human eye, including vestibulo-ocular movements holding an image steady on the retina during brief head movements; optokinetic movements holding an image during sustained head movements; saccadic movements shifting the fovea, or center of vision, rapidly to a target; pursuit movements keeping the image of a moving target on the fovea; and vergence movements moving each of a pair of eyes in opposite directions to position an image on the foveae. Mimicking these types of movements have many applications in virtual reality; augmented reality; pan, tilt and other actuation mechanisms for cameras and camcorders; man-machine interfaces; and the like.

The vestibular system provides a sixth sense of balance in humans. The vestibular system is linked to ocular muscles to compensate for brief jerky movements of the head, such as the ones experienced when going over a pebble while riding a bicycle. When coupled with inertial or motion sensors 120, control logic 112 can be used to move imaging sensor 92 in response to or to compensate for brief jerky or vibrating movements of the platform upon which camera 80 is mounted. Such control makes observation of scenes through moving camera 80 more tolerable. For example, an operator or observer of a scene provided from a moving camera 80 would suffer less from vertigo or nausea as a result of watching through artificial eyes.

Optokinetic movement compensates for sustained movements of the camera platform. Optokinetic movement can also be compensated or corrected using a magnetic actuation mechanism of the present invention. As in vestibular correction, one or more motion sensors 120 may provide input for optokinetic correction. Also, it may be useful to have advance notice of gross movements such as, for example, from a navigational system. Since optokinetic movements of the magnetic actuation system are in response to sustained movements, data required to generate the specific pattern of pulses to be communicated to the magnetic actuation mechanism could come from visual sensor 92 embedded in housing 86.

Saccadic eye movements bring new objects of interest to the fovea of the eye, which has the highest concentration of color sensitive light sensors, or cones, in the back of the eye. Saccadic eye movements are to objects that are in the field of view, but not in the field of view of the fovea. This applies specifically to an eye with a variable resolution, such as the human eye, which samples objects in the center at a high resolution than objects around the periphery. Imaging array 92 may be constructed with nonhomogeneous sensing capabilities. For example, imaging array 92 may be equipped with additional circuits, resulting in positioning light sensors in a certain high resolution area. Also, imaging array 92 may be equipped with multiple types of sensors that respond to different frequencies of the electromagnetic spectrum. Thus, there may be a need to position different types of sensors at different resolutions across the sensory grid. Additionally, creating human-like visual sensing and perception will likely require a multiresolution camera or camera-like sensor. Saccadic eye movements would be useful in all three of these cases. Yet another application of saccadic eye movements applies to uniform resolution cameras in shifting the depth and focus of the attention.

Pursuit movements may be calculated in response to the visual information provided from imaging array 92. An example scenario is a videoconferencing system which allows conference participants to move around while being tracked by camera 80. In another scenario, a magnetic actuation mechanism programmed with pursuit movements may be used to make recordings of moving subjects without the need for a camera operator to position camera 80 in response to the movements of the subjects.

Vergence movements involve two or more cameras 80, 118. Vergence movements play a role in judging the depth of objects in the visual field. Typically, vergence movements focus two eyes on a target until there is no horizontal disparity in the image of the object between the eyes. This allows for minute corrections in the performance of a task. Thus, vergence movements of cameras 80, 118 may be used in guiding robots in unstructured settings. Another application is in visual man-machine interfaces that detect and follow subtle visual differences in the direction of the gaze of a human operator. Saccadic movements may be added onto vergence movements to shift the attention between different depth planes.

Figure 9:
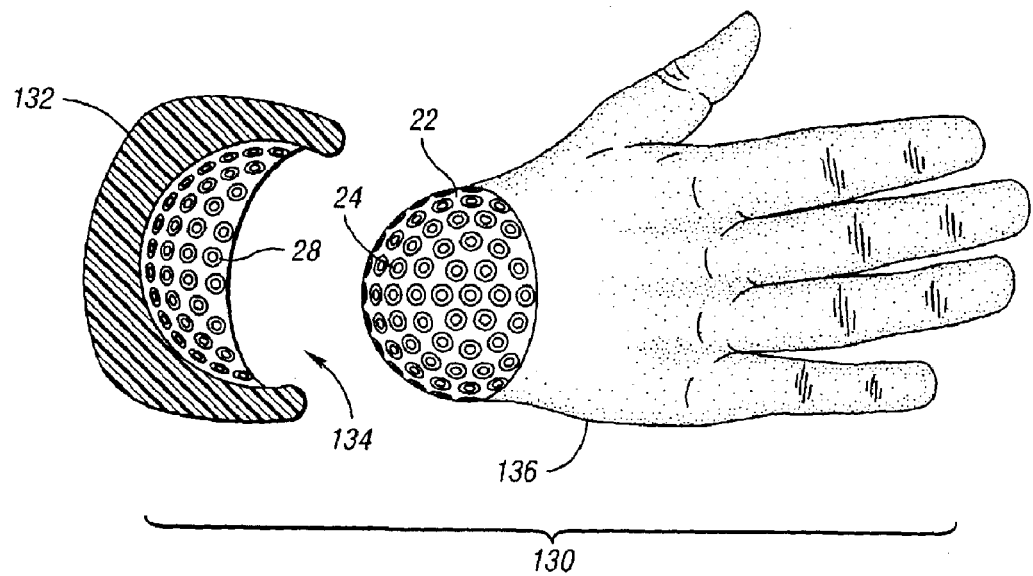
FIG. 9 is an exploded view drawing illustrating magnetic actuation for control of robotic manipulator movement according to an embodiment of the present invention.

Referring now to FIG. 9, an exploded view drawing illustrating magnetic actuation for control of robotic manipulator movement according to an embodiment of the present invention is shown. A robotic joint, shown generally by 130, includes socket 132 having a cavity, shown generally by 134, accepting robotic manipulator 136. Activation surface 26 within cavity 134 supports a plurality of electromagnetic coils 28. Manipulator 136 includes curved surface 22 having a plurality of magnetic positioners 24. As described above, electromagnetic coils 28 are energized to attract or repel magnetic positioners 24, thereby moving manipulator 136 relative to socket 132. By using a plurality of magnetic positioners 24 and coils 28, manipulator 136 may be moved through all three rotational degrees of freedom. A wide variety of joints may be constructed in this manner, including ball and socket joints, pivot joints, hinge joints, gliding joints, saddle joints, and the like.

Figure 10:
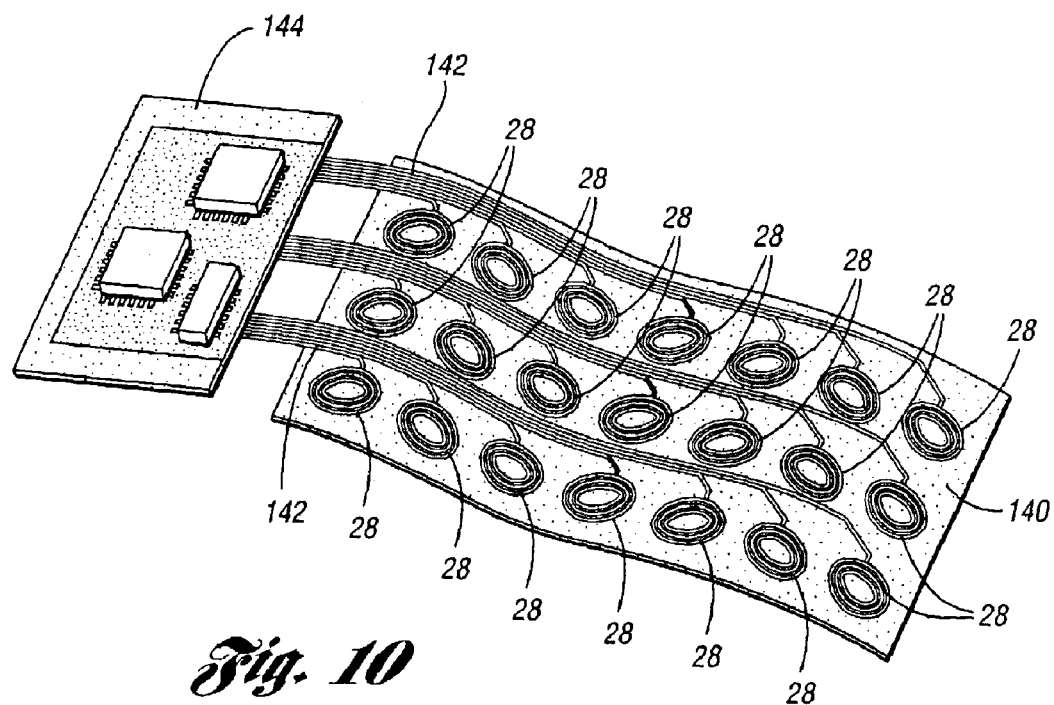
FIG. 10 is a schematic drawing illustrating a flexible circuit board with multiple addressable coils according to an embodiment of the present invention.

Referring now to FIG. 10, a schematic drawing illustrating a flexible circuit board with multiple addressable coils according to an embodiment of the present invention is shown. Magnetic coils 28 can be embedded into flexible circuit board 140. Since a flexible material is used, flexible circuit board 140 may be formed into a wide variety of surfaces for use as either or both of curved surface 22 and actuation surface 26. One example of such a flexible material is Novaflex® from Sheldahl, Inc. of Northfield, Minn. Flexible traces 142 on flexible circuit board 140 connect coils 28 with printed circuit board 144 which may contain drive electronics, sensing electronics, control logic, and the like.

Figure 11:
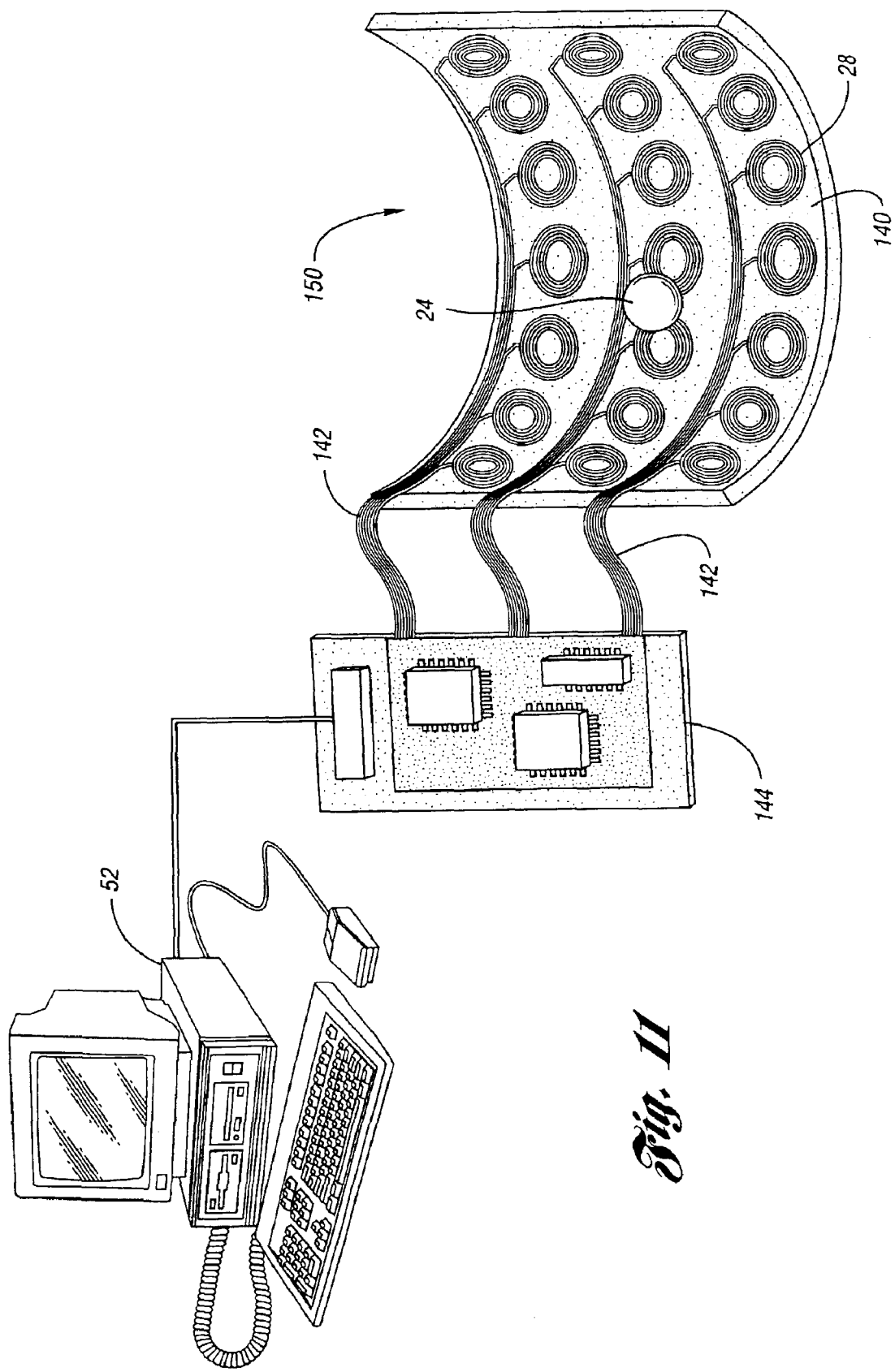
FIG. 11 is a schematic drawing illustrating a flexible circuit board with embedded controllable electromagnets arranged on a curved surface according to an embodiment of the present invention.

Referring now to FIG. 11, a schematic drawing illustrating a flexible circuit board with embedded controllable electromagnets arranged on a curved surface according to an embodiment of the present invention is shown. An array of coils 28 is embedded onto flexible circuit board 140, which is then fit into a cylindrical cavity or socket, shown generally by 150. Rigid circuit board 144 is used to activate each coil 28 in the array. Based on which coil 28, or group of coils 28, are activated, the displacement of magnetic positioner 24 can be controlled. Controlling signals are sent to addressable rigid circuit board 144 from computer 52.

Figure 12:
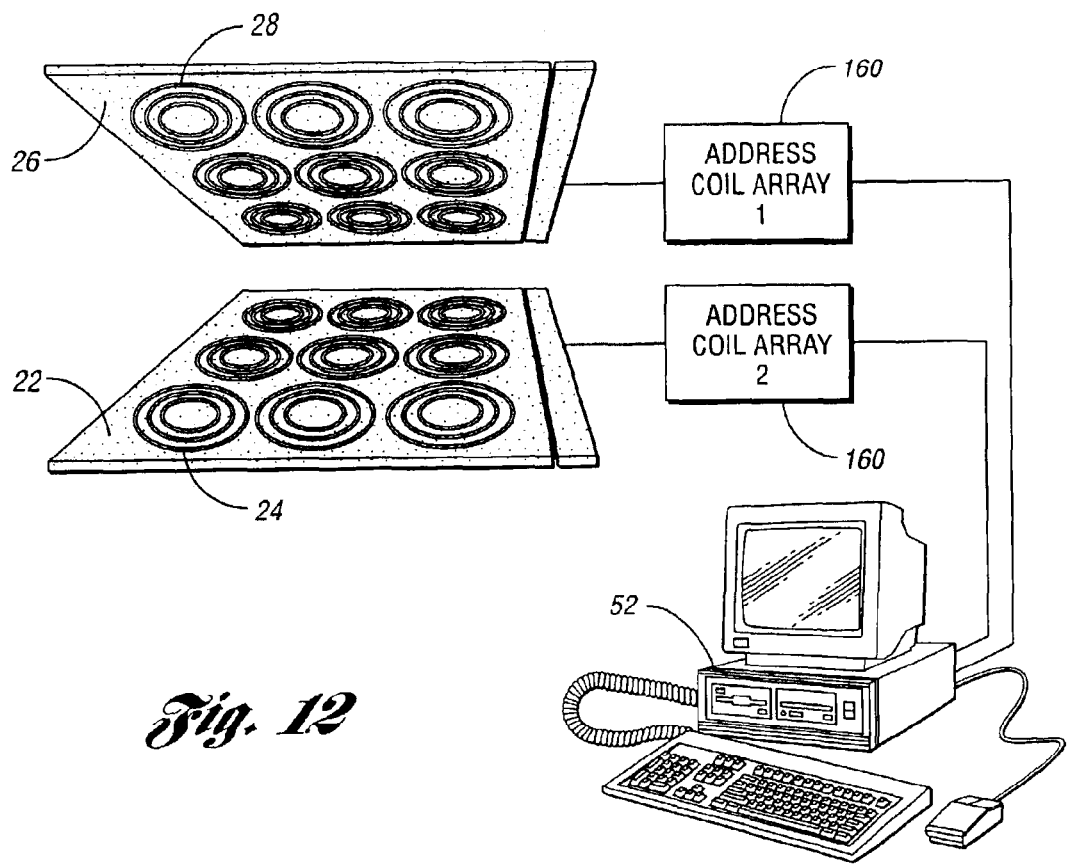
FIG. 12 is a schematic diagram illustrating a system having two electromagnetic coil surfaces according to an embodiment of the present invention.

Referring now to FIG. 12, a schematic diagram illustrating a system having two electromagnetic coil surfaces according to an embodiment of the present invention is shown. Activation surface 26 includes electromagnetic coils 28. Curved surface 22 also includes electromagnetic coils functioning as magnetic positioners 24. Each set of coils 24, 28 are energized from addressable drivers 160 controlled by computer 52. This approach has several advantages. First less current is needed in each electromagnet 28 since a whole surface is used. Second, the position of one surface in relation to the other may be reset with greater ease. Control logic 52 may be modified to take into consideration both surfaces 22, 26, thus creating greater flexibility for creating attractive and repulsive forces. Typically, separate activation sequences would be sent out to each set of drivers 160 for each surface 22, 26.

Figure 13:
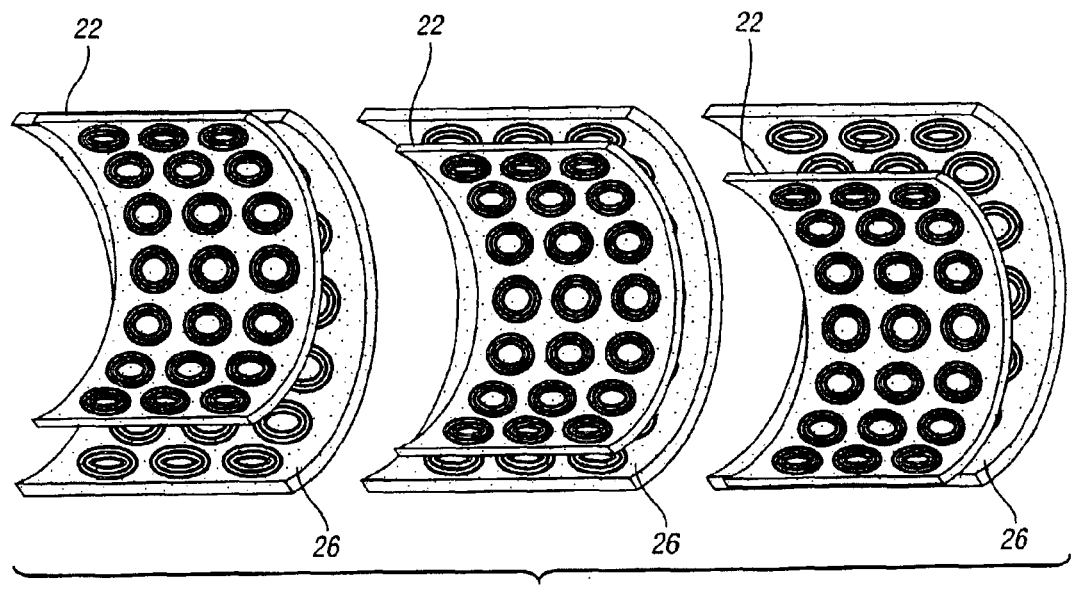
FIG. 13 is an illustration of magnetic positioning based on the movement of two electromagnetic coil surfaces according to an embodiment of the present invention.

Referring now to FIG. 13, an illustration of magnetic positioning based on the movement of two electromagnetic coil surfaces according to an embodiment of the present invention is shown. Surfaces 22, 26 may be formed into a variety of shapes. Further, the shape of curved surface 22 need not correspond with the shape of actuation surface 26. By appropriately controlling current to coils 28 and magnetic positioners 24, curved surface 22 can be made to slide across and rotate relative to actuation surface 26 to create highly customized aiming and positioning patterns.

Figure 14:
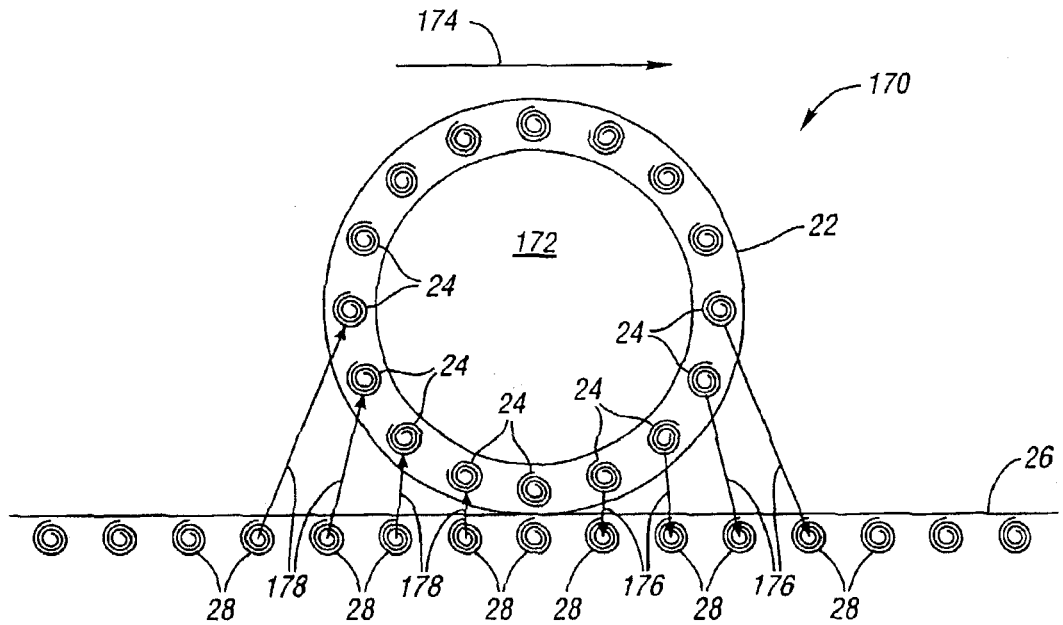
FIG. 14 is an illustration of rolling positioning across a flat surface according to an embodiment of the present invention.

Referring now to FIG. 14, an illustration of rolling positioning across a flat surface is shown. A positioning system, shown generally by 170, includes a flat actuation surface 26. A plurality of controlled electromagnets 28 are spaced about actuation surface 26. Curved surface 22 is positioned to roll on actuation surface 26. Curved surface 22 may be formed on any housing 172 with a circular cross-section. As examples, housing 172 may be shaped like a cylinder, tapered cylinder, disk, sphere, partial sphere, cone, truncated cone, and the like. Curved surface 22 includes a plurality of magnetic positioners 24.

During operation, electromagnetic coils 28 are energized to roll curved surface 22 relative to actuation surface 26. In a preferred embodiment, electromagnetic coils 28 in front of housing 172 along direction of motion 174 are energized to generate attractive forces 176 between electromagnetic coils 28 and magnetic positioners 24. Electromagnetic coils 28 in back of housing 172 along direction of motion 174 are energized to generate repulsive forces 178 between electromagnetic coils 28 and magnetic positioners 24.

Figure 15:
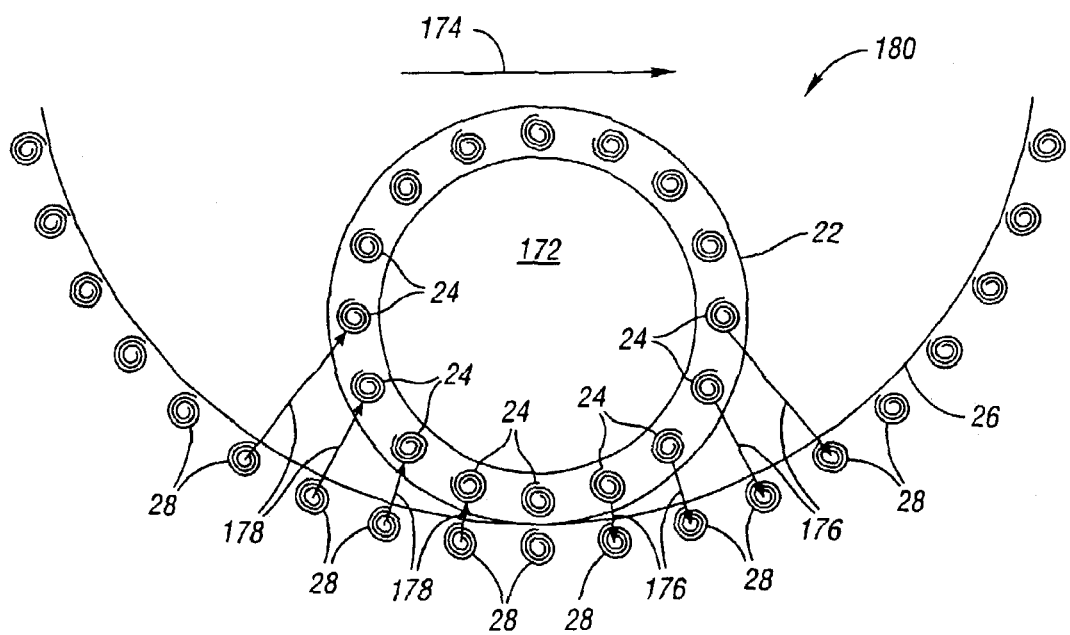
FIG. 15 is an illustration of rolling positioning across a non-flat surface according to an embodiment of the present invention.

Referring now to FIG. 15, an illustration of rolling positioning across a non-flat surface is shown. A positioning system, shown generally by 180, includes a non-flat actuation surface 26. A plurality of controlled electromagnets 28 are spaced about actuation surface 26. Curved surface 22 is positioned to roll on actuation surface 26. Curved surface 22 may be formed on any housing 172 with a circular cross-section. A plurality of magnetic positioners 24 are disposed about curved surface 22. In operation, system 180 functions similarly to system 170 described above. However, the path traversed by housing 172 will no longer be restricted to within a single plane.

Figure 16:
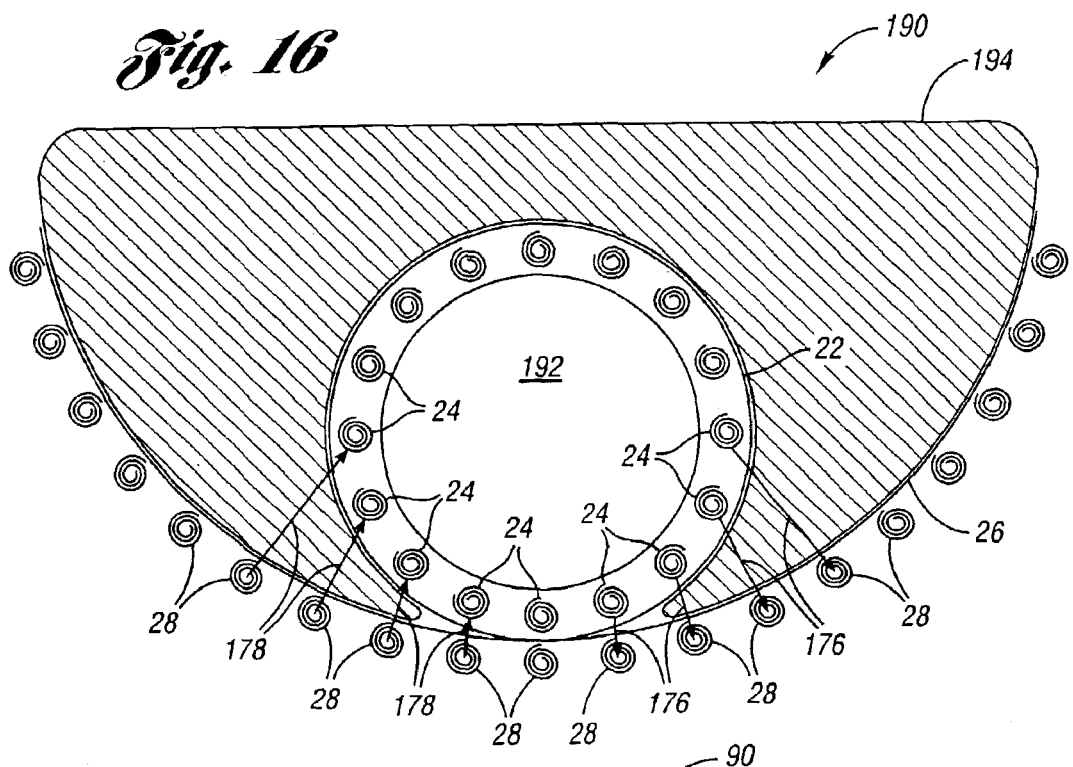
FIG. 16 is an illustration of housing positioning using an internal rolling positioner according to an embodiment of the present invention.

Referring now to FIG. 16, an illustration of housing positioning using an internal rolling positioner is shown. A positioning system, shown generally by 190, includes rolling positioner 192 disposed within housing 194. Rolling positioner 192 includes curved surface 22 having a plurality of magnetic positioners 24. Rolling positioner 192 rolls on actuation surface 26. A plurality of electromagnets 28 are disposed on actuation surface 26.

During operation, electromagnets 28 are energized to roll curved surface 22 relative to actuation surface 26. In a preferred embodiment, electromagnetic coils 28 on one side of rolling positioner 192 are energized to generate attractive forces 176 between electromagnetic coils 28 and magnetic positioners 24. Electromagnetic coils 28 on the other side of rolling positioner 192 are energized to generate repulsive forces 178 between electromagnetic coils 28 and magnetic positioners 24. This causes rolling positioner 192 to roll along actuation surface 26 and roll within housing 194.

Actuation surface 26 may be flat, allowing housing 194 to translate along actuation surface 26. Actuation surface 26 may form a cavity in which housing 194 may rotate, allowing housing 194 to be rotatively positioned. Actuation surface 26 may form a channel, allowing housing 194 to move through the channel. Any combination of these and other modes of positioning housing 194 relative to actuation surface 26 are possible.

Figure 17:
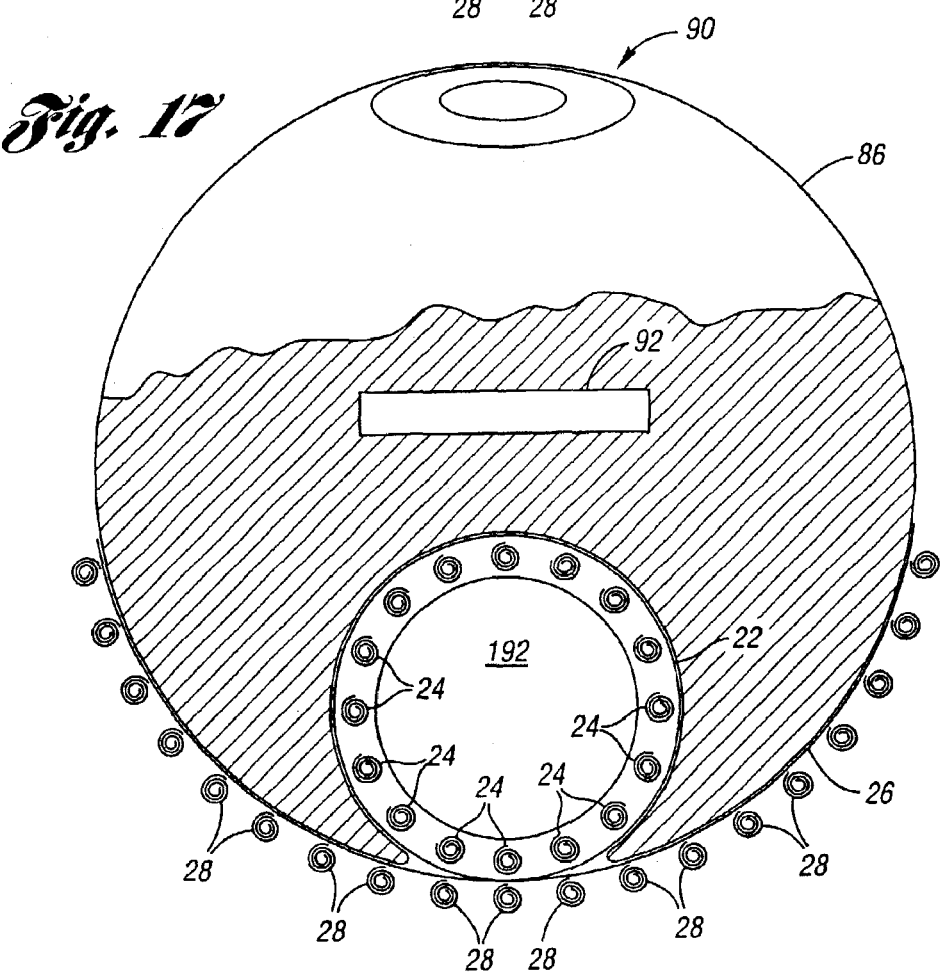
FIG. 17 is an illustration of a camera positioned according to an embodiment of the present invention.

Referring now to FIG. 17, an illustration of a camera positioned according to an embodiment of the present invention is shown. Camera 80 includes housing 86 with aperture surface 88. Aperture surface 88 defines aperture 90 which admits light into housing 86. Aperture 90 may include a light modifying device such as a lens, an iris, and the like. Imaging array 92 is positioned within housing 86 to receive light entering through aperture 90. Housing 86 also includes rolling positioner 192. Rolling positioner 192 includes curved surface 22 having a plurality of magnetic positioners 24. Housing 86 fits into actuation surface 26 allowing rolling positioner 192 to roll on actuation surface 26. A plurality of electromagnets 28 are disposed on actuation surface 26. Energizing electromagnets 28 causes rolling positioner 192 to roll along actuation surface 26, rotating housing 86 and aiming camera 80.

Figure 18:
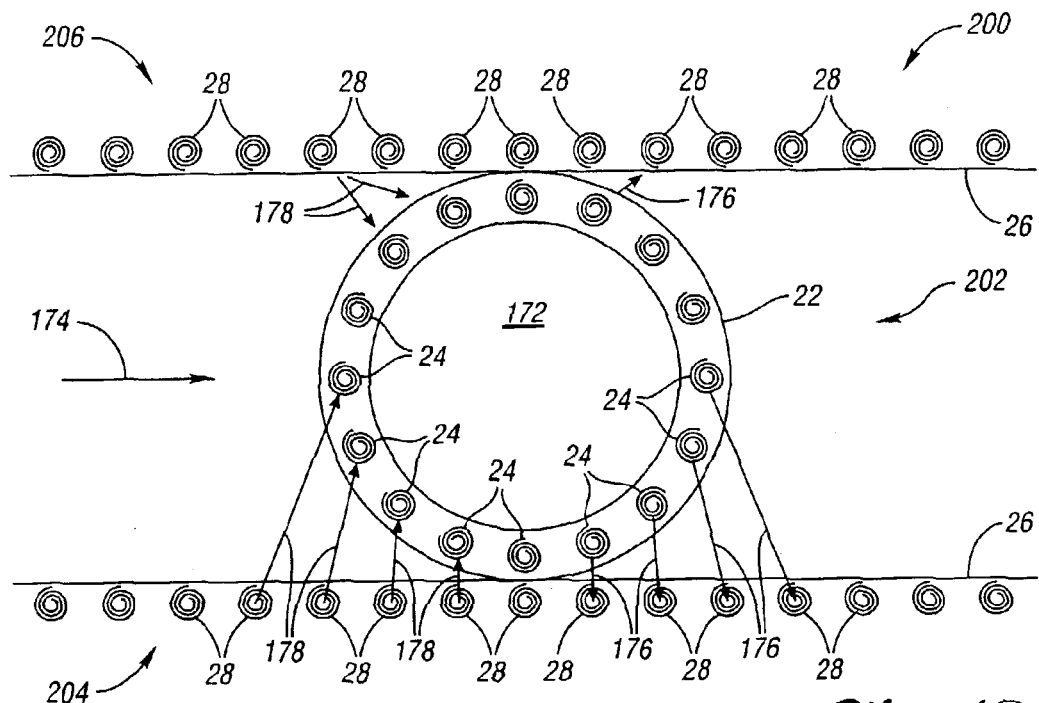
FIG. 18 is an illustration of a tubular positioning system according to an embodiment of the present invention.

Referring now to FIG. 18, an illustration of a tubular positioning system according to an embodiment of the present invention is shown. A positioning system, shown generally by 200, includes actuation surface 26 formed as a tube or channel. Rolling positioner 192 is positioned within channel 202 to roll along at least one face or portion of actuation surface 26.

In operation, electromagnetic coils 28 on one side 204 in front of rolling positioner 192 along direction of motion 174 are energized to generate attractive forces 176 between electromagnetic coils 28 and magnetic positioners 24. Electromagnetic coils 28 in back of rolling positioner 192 along direction of motion 174 are energized to generate repulsive forces 178 between electromagnetic coils 28 and magnetic positioners 24. Energized coils 28 may be on only one side 204 of tube 202, may be on opposing sides 204, 206 of tube 202, or may be around the entire cross-section of tube 202.

Figure 19:
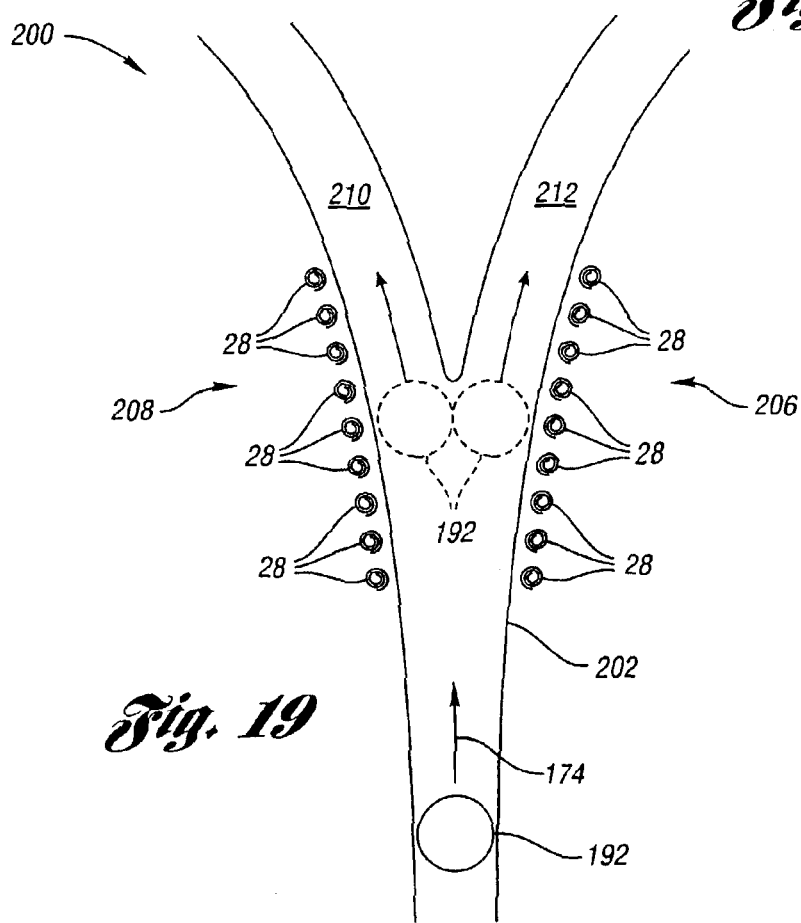
FIG. 19 is an illustration of tubular branching according to an embodiment of the present invention.

Referring now to FIG. 19, an illustration of tubular branching according to an embodiment of the present invention is shown. Positioning system 200 may include branches, indicated by left branch 210 and right branch 212. Rolling positioner 192 may be routed into left branch 210 by activating electromagnetic coils 28 on side 208 of tube 202. Rolling positioner 192 may be routed into right branch 212 by activating electromagnetic coils 28 on side 206 of tube 202. To assist in routing, electromagnetic coils on the opposite side may generate repulsing forces.

Positioning system 200 may be used in a variety of applications. Tube 202 may be part of an artificial circulatory system. Material may be carried through the system within rolling positioner 192 or rolling positioner 192 may push material through the system. Positioning system 200 may also be used in a flexible manufacturing system. For example, material to be deposited can be routed down tube 202 to slots in tube 202 where the material exits tube 202. Tube 202 may also be porous in sections to materials transported through tube 202.

Figure 20:
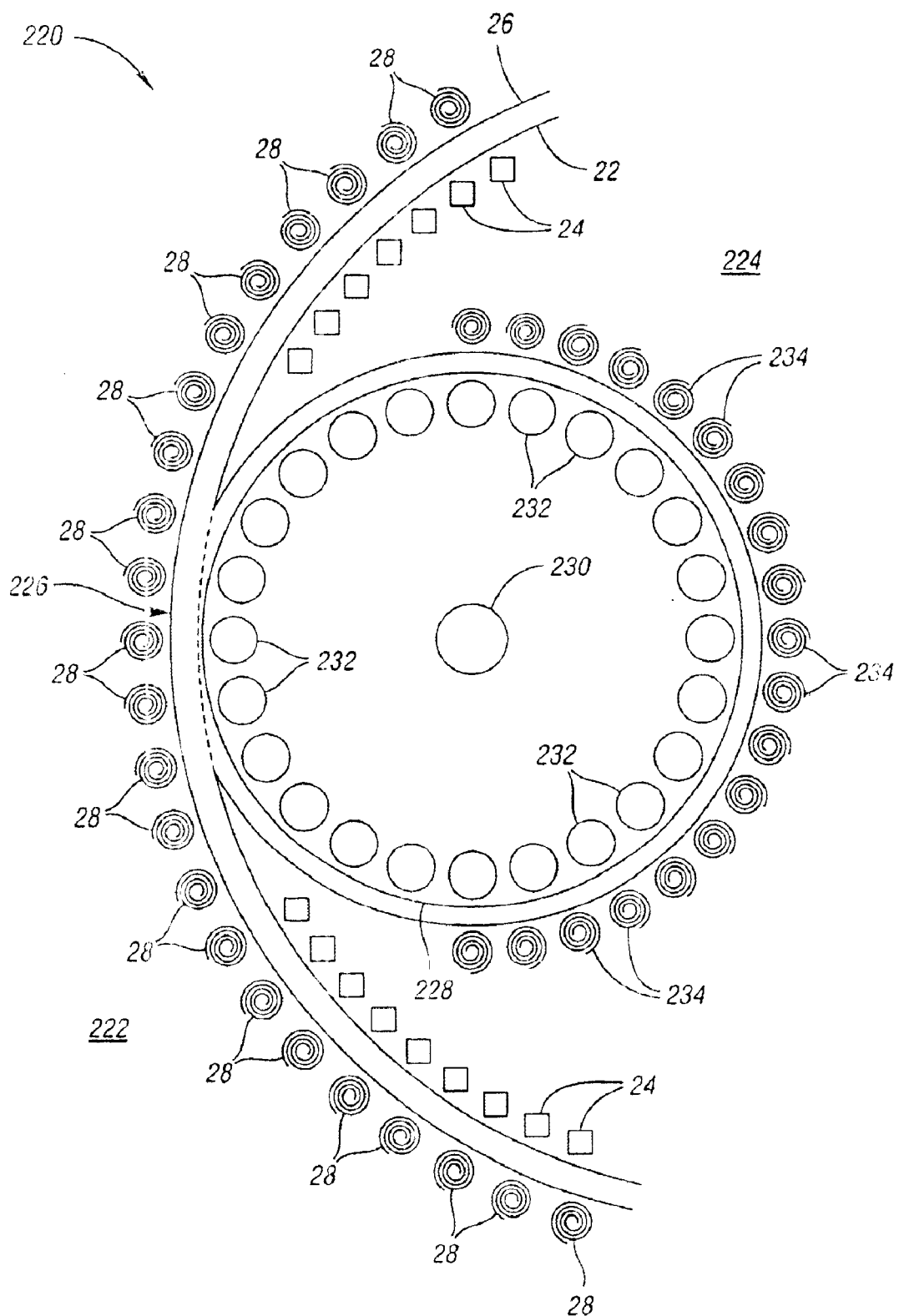
FIG. 20 is an illustration of a magnetic system for generating power within a positionable housing.

Referring now to FIG. 20, an illustration of a magnetic system for generating power within a positionable housing is shown. A magnetic system, shown generally by 220, includes body 222 defining a cavity with walls formed by actuation surface 26 containing a plurality of electromagnetic coils 28. Housing 224 having curved outer surface 22 defines electromagnetic transparent opening 226. Opening 226 may be a physical opening in housing 224 or may be a portion of housing 224 made of a material through which may pass electromagnetic energy. Housing curved surface 22 is positioned to rotate within body 222. At least one magnetic positioner 24 is located at or near curved surface 22.

Rotor 228 is held by shaft 230 to rotate by opening 226 within housing 224. In the embodiment shown, rotor 228 rotates within the plane of FIG. 20. At least one rotor magnet 232 is fixed on rotor 228. At least one electromagnetic pickup 234 is disposed within housing 224 in proximity with rotor 228. Each pickup 234 receives a time-varying electromagnetic field from magnet 232 as rotor 238 rotates past pickup 234.

In operation, coils 28 interact with magnetic positioners 24 to position housing 224 relative to body 222. Coils 28 are energized to attract and/or repel magnets 232 in a manner causing rotor 228 to rotate. As rotor 228 spins, magnets 232 rotate past pickups 234, inducing energy in pickups 234. This energy may be used to power electronics within housing 224. Preferably, control logic for controlling coils 28 to position housing 224 is the same control logic used to rotate rotor 228.

Figure 21:
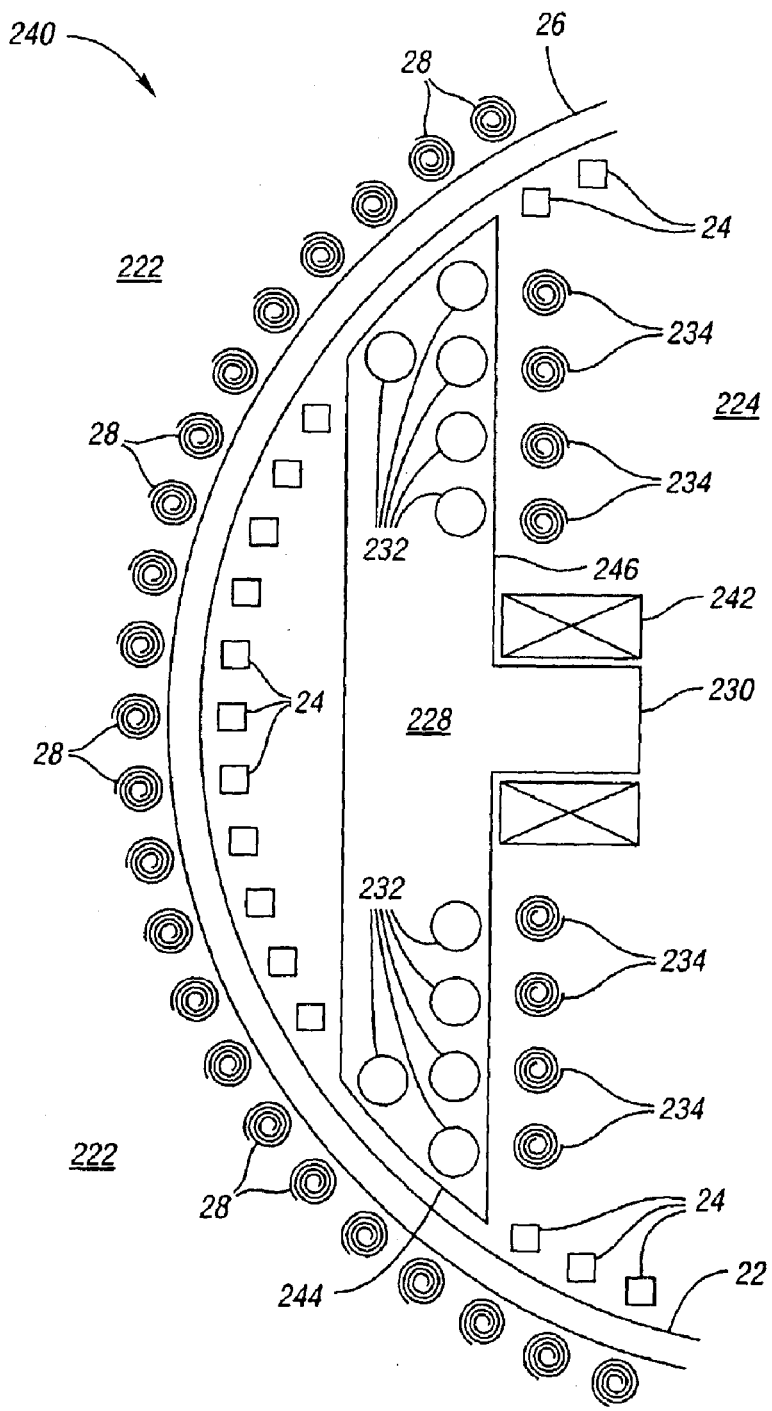
FIG. 21 is an illustration of an alternative magnetic system for generating power within a positionable housing.

Referring now to FIG. 21, an illustration of an alternative magnetic system for generating power within a positionable housing is shown. A magnetic system, shown generally by 240, includes body 222 in which may be rotatably positioned housing 224 through the interaction of electromagnetic coils 28 with magnetic positioners 24. Housing 224 includes rotor 228 which may rotate about shaft 230 supported by bearing 242. In this embodiment, rotor 228 is disk-shaped. Magnets 232 near outer surface 244 of rotor 228 interact with coils 28 to spin rotor 228. Magnets 232 near back surface 246 of rotor 228 generate time-varying electromagnetic fields as sensed by pickups 234 as rotor 228 rotates by pickups 234. Some magnets 232 may be used both to drive rotor 228 and to generate energy in pickups 234.

Figure 22:
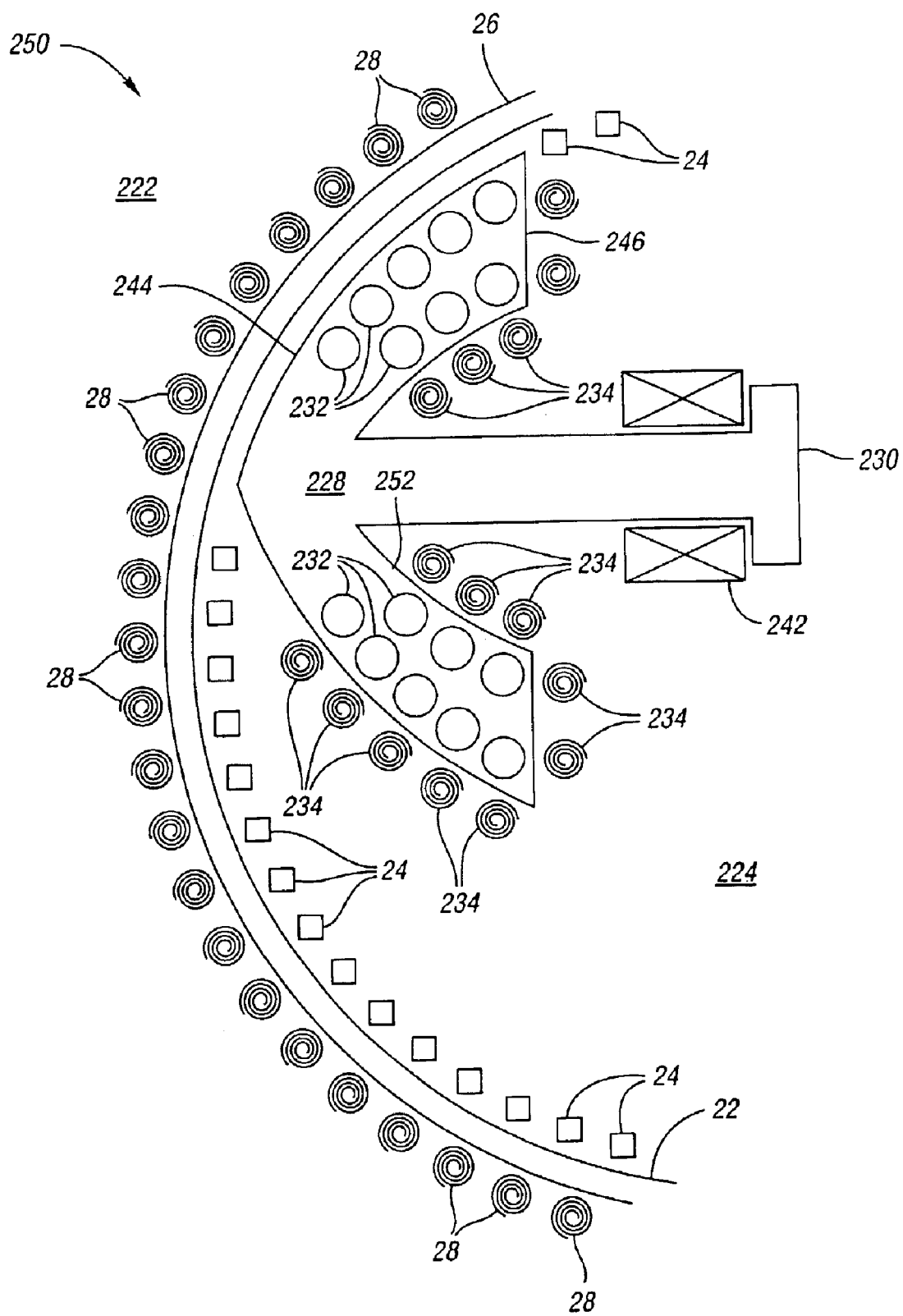
FIG. 22 is an illustration of another alternative magnetic system for generating power within a positionable housing.

Referring now to FIG. 22, an illustration of another alternative magnetic system for generating power within a positionable housing is shown. A magnetic system, shown generally by 250, includes body 222 in which may be rotatably positioned housing 224 through the interaction of electromagnetic coils 28 with magnetic positioners 24. Housing 224 includes rotor 228 which may rotate about an axis provided by shaft 230. Shaft 230 is supported by bearing 242. In this embodiment, rotor 228 is shaped like a top. Magnets 232 near outer surface 244 of rotor 228 interact with coils 28 to spin rotor 228 during a portion of a revolution of rotor 228 and generate time-varying electromagnetic fields as sensed by pickups 234 as rotor 228 rotates by pickups 234 during a different portion of the revolution of rotor 228. Magnets 232 near back surface 246 of rotor 228 and inside surface 252 generate time-varying electromagnetic fields as sensed by pickups 234 as rotor 228 rotates by pickups 234.

Figure 23:
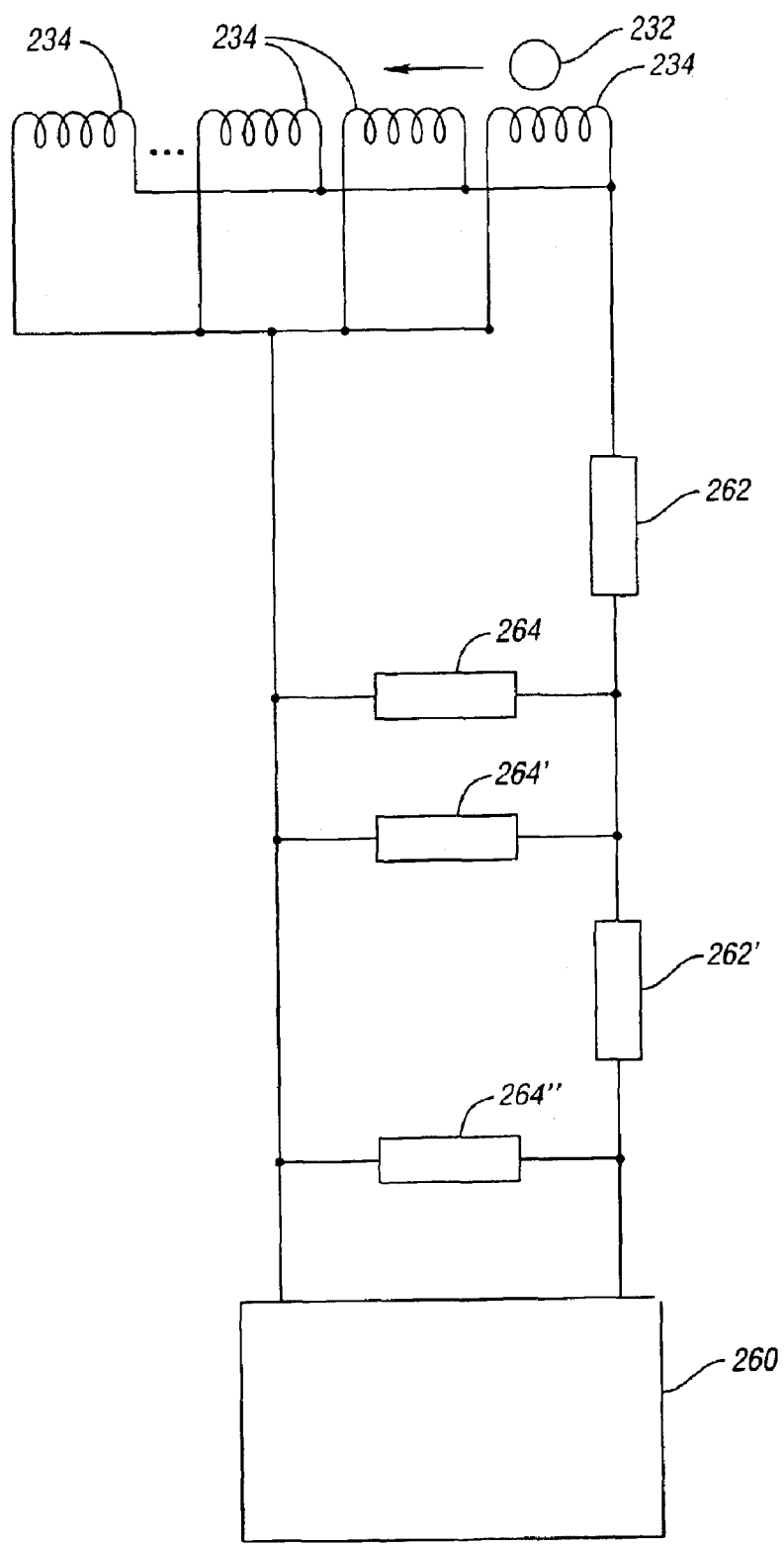
FIG. 23 is an illustration of circuitry for delivering power to electronics within a positionable housing.

Referring now to FIG. 23, an illustration of circuitry for delivering power to electronics within a positionable housing is shown. As magnet 232 moves by electromagnetic pickup 234, an electrical current is induced in pickup 234. When conditioned, this current may be used to power electronics 260 within housing 224. Energy may be conditioned by limiting components 262, such as resistors, diodes, and the like, and storage/filtering components 246, such as capacitors, batteries, zener diodes, voltage regulators, resistors, and the like. For example, limiting component 262 may include a current limiting resistor in series with a diode. Components 264 and 264' may be a capacitor for storing voltage and a zener diode for over-voltage protection, respectively. Component 264" may be a battery and component 262' may be a diode positioned to prevent the battery from draining through pickups 234.

Figure 24A:
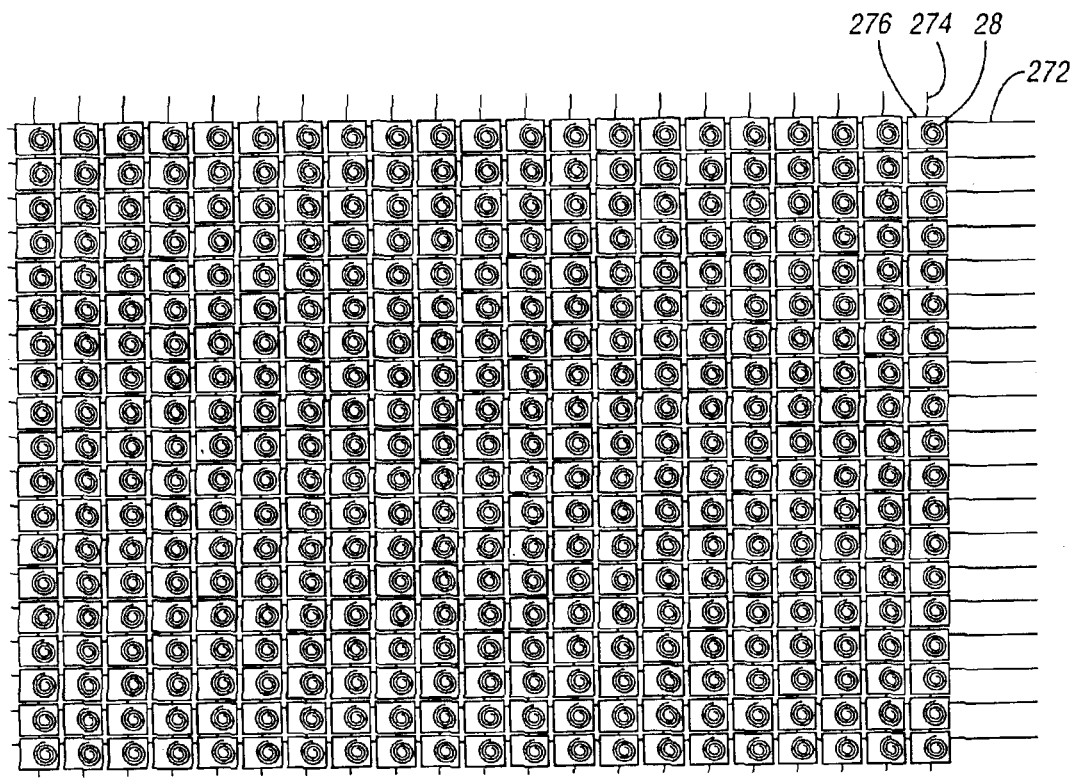
FIGS. 24a and 24b is an illustration of an array of electromagnetic coils according to an embodiment of the present invention.
Figure 24B:
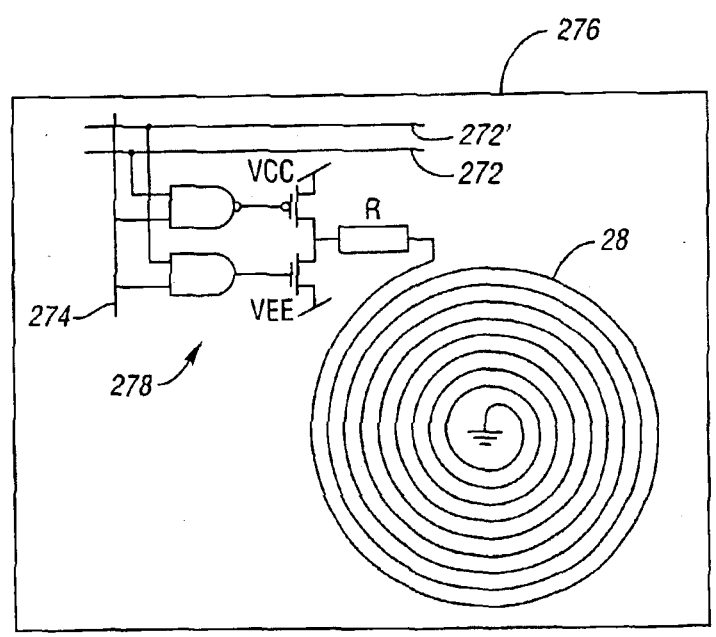

Referring now to FIGS. 24a and 24b, an illustration of an array of electromagnetic coils is shown. Coils 28 are arranged as an array of coils, shown generally by 270. Coils 28 are arranged in rows and columns with each row accessed by a row access line, one of which is indicated by 272, and each column accessed by a column access line, one of which is indicated by 274. Each coil 28 may be part of a cell, one of which is shown by 276. Each cell may include logic 278 for supplying current to coil 28 when row access line 272 for the row containing coil 28 and column access line 274 for the column containing coil 28 are both asserted. As will be recognized by one skilled in the art, this technique is similar to addressing solid state memory cells. Entire rows or columns of coils 28, as well as subsets of rows or columns, may also be concurrently turned on by this technique. The electromagnetic field produced by coil 28 may be reversed by reversing the current through coil 28. This may be accomplished through the use of another control line such as, for example, second row access line 272'. In addition, coils 28 may be broken into overlapping or non-overlapping sets that may be controlled separately for different purposes such as, for example, for positioning a housing and for generating power within the housing.

While embodiments of the invention have been illustrated and described, it is not intended that these embodiments illustrate and describe all possible forms of the invention. The present invention may be used to aim or position a wide variety of objects. Embodiments described herein include several for aiming a camera, but one of ordinary skill in the art will recognize that any type of transducer may be aimed by the present invention including, for example, microphones, photodetectors, radiation detectors, antennas, and the like. Energy transmitting transducers, such as light and sound sources, may also be used. The present invention may also be employed to aim or position a wide variety of tools or workpieces. Thus, the words used in the specification are words of description rather than limitation, and it is understood that various changes may be made without departing from the spirit and scope of the invention.

What is claimed is:

1. A magnetic system comprising:

a body having at least one cavity wall defining a cavity;

a plurality of controlled electromagnets spaced about the at least one cavity wall;

a housing having a curved outer surface defining an electromagnetically transparent opening, the housing curved surface rotatively positioned within the cavity;

at least one magnetic positioner fixed to move with the curved outer surface;

a rotor rotatively fixed within the housing, the rotor positioned to rotate by the housing opening;

at least one rotor magnet fixed on the rotor; and at least one electromagnetic pickup disposed within the housing in proximity with the rotor, each pickup receiving a time-varying electromagnetic field from at least one rotor magnet as the rotor rotates.

2. A magnetic system as in claim 1 further comprising control logic in communication with the plurality of controlled electromagnets, the control logic energizing at least one of the controlled electromagnets to create magnetic interaction with at least one magnetic positioner and thereby move the housing relative to the cavity.

3. A magnetic system as in claim 1 further comprising control logic in communication with the plurality of controlled electromagnets, the control logic energizing at least one of the controlled electromagnets to create magnetic interaction with the at least one rotor magnet to spin the rotor within the housing.

4. A magnetic system as in claim 1 further comprising at least one electronic system disposed within the housing, the electronic system powered by energy from each pickup receiving a time-varying electromagnetic field.

5. A magnetic system as in claim 1 wherein the plurality of controlled electromagnets spaced about the at least one cavity wall comprises a first set of electromagnets for positioning the housing and a second set of electromagnets for rotating the rotor.

6. A magnetic system as in claim 1 wherein the at least one rotor magnet fixed on the rotor is a first set of at least one magnet for spinning the rotor and a second set of at least one magnet for generating each time-varying electromagnetic field received by each pickup.

* * * * *